United States Patent
Paik et al.

(10) Patent No.: US 9,862,460 B2
(45) Date of Patent: Jan. 9, 2018

(54) PROPELLER FOR SHIP, AND ASSEMBLING METHOD AND DISASSEMBLING METHOD THEREFOR

(71) Applicant: SAMSUNG HEAVY IND. CO., LTD., Seoul (KR)

(72) Inventors: Kwang-Jun Paik, Daejeon (KR); Hyun-Sang Park, Geoje-si (KR); Jin-Suk Lee, Daejeon (KR); Tae-Goo Lee, Daejeon (KR); Ji-Nam Kim, Tongyeong-si (KR); Jin-Ho Kim, Geoje-si (KR); Jae-Ouk Roh, Seoul (KR); Tae-Sam Choi, Geoje-si (KR); Kwang-Kun Park, Daejeon (KR); Hyoung-Gil Park, Daejeon (KR); Chi-Su Song, Daejeon (KR); Se-Myun Oh, Seoul (KR); Dong-Hyun Lee, Daejeon (KR); Jeung-Hoon Lee, Daejeon (KR); Jae-Kwon Jung, Daejeon (KR); Tae-Sik Lee, Geoje-si (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 298 days.

(21) Appl. No.: 14/648,906

(22) PCT Filed: May 16, 2013

(86) PCT No.: PCT/KR2013/004337
§ 371 (c)(1),
(2) Date: Jun. 1, 2015

(87) PCT Pub. No.: WO2014/088167
PCT Pub. Date: Jun. 12, 2014

(65) Prior Publication Data
US 2015/0314846 A1    Nov. 5, 2015

(30) Foreign Application Priority Data

Dec. 3, 2012  (KR) .................. 10-2012-0139278
Dec. 3, 2012  (KR) .................. 10-2012-0139279
(Continued)

(51) Int. Cl.
*B63H 5/10*    (2006.01)
*B63B 9/00*    (2006.01)
(Continued)

(52) U.S. Cl.
CPC ................ *B63B 9/00* (2013.01); *B63H 5/10* (2013.01); *B63H 23/34* (2013.01);
(Continued)

(58) Field of Classification Search
CPC ............... B63H 5/10; B63H 2005/106; B63H 2023/0283; B63H 2023/067; B63H 2023/325; B63H 2023/323
See application file for complete search history.

(56) References Cited

U.S. PATENT DOCUMENTS 4,642,059 A * 2/1987 Nohara .................. B63H 5/10
                                                       416/129
5,030,149 A * 7/1991 Fujita .................. B63H 23/30
                                                       416/129
(Continued)

FOREIGN PATENT DOCUMENTS

JP    43-10422    4/1968
JP    61-71297    4/1986
(Continued)

OTHER PUBLICATIONS

Office Action dated Aug. 3, 2016 for Chinese Patent Application No. 201380063050.8 and its machine translation by Google Translate.
(Continued)

*Primary Examiner* — Ninh H Nguyen
(74) *Attorney, Agent, or Firm* — Ladas & Parry, LLP

(57) ABSTRACT

Disclosed are a propulsion system for a ship, a method of assembling the same, and a method of disassembling the same. The propulsion system for the ship includes: a rear propeller fixed to a rotary shaft; a front propeller that is rotatably supported on the rotary shaft in front of the rear propeller; a contra-rotating device that is mounted in an installation space at a rear end of a hull so as to reverse the rotation of the rotary shaft and transmit the reversed rotation to the front propeller; a propeller connecting member that connects the contra-rotating device and the front propeller to transmit a rotational force; and a thrust supporting device that is provided between the contra-rotating device and the propeller connection member to support thrust of the front propeller.

17 Claims, 22 Drawing Sheets

(30) Foreign Application Priority Data

Dec. 3, 2012 (KR) .................. 10-2012-0139280
Dec. 4, 2012 (KR) .................. 10-2012-0139858

(51) Int. Cl.
*B63H 23/34* (2006.01)
*B63H 23/32* (2006.01)

(52) U.S. Cl.
CPC .. *B63B 2009/007* (2013.01); *B63H 2023/323* (2013.01); *B63H 2023/325* (2013.01); *B63H 2023/327* (2013.01); *Y02T 70/146* (2013.01); *Y10T 29/49323* (2015.01)

(56) References Cited

U.S. PATENT DOCUMENTS

| | | | | |
|---|---|---|---|---|
| 5,083,989 A | * | 1/1992 | Yates | F16H 37/0813 |
| | | | | 475/248 |
| 6,540,570 B1 | * | 4/2003 | Eakin | B63H 7/02 |
| | | | | 440/37 |
| 2011/0033296 A1 | | 2/2011 | Shuto et al. | |

FOREIGN PATENT DOCUMENTS

| | | |
|---|---|---|
| JP | 61-171694 | 10/1986 |
| JP | 62-244791 | 10/1987 |
| JP | 62-279189 | 12/1987 |
| JP | 63-93698 | 4/1988 |
| JP | 3-150381 | 6/1991 |
| JP | 5-42745 | 6/1993 |
| KR | 1991-0016568 | 11/1991 |
| KR | 10-2010-0102680 | 9/2010 |

OTHER PUBLICATIONS

Office Action dated Jul. 5, 2016 for Japanese Patent Application No. 2015-545344 and its machine translation by Google Translate.
International Preliminary Report on Patentability (Chapter II) of Mar. 20, 2015 for PCT/KR2013/004337 and its English translation by WIPO.
Written Opinion of the International Searching Authority of Aug. 13, 2013 for PCT/KR2013/004337 and its machine translation by Google Translate.
Office Action dated Apr. 13, 2017 for Chinese Patent Application No. 201380063050.8 and its English translation provided by Applicant's foreign council.
International Search Report dated Aug. 13, 2013 for PCT/KR2013/004337 and its English translation.
Notice of Allowance dated Aug. 23, 2017 for Chinese Patent Application No. 201380063050.8 and its English translation from Global Dossier.

* cited by examiner

PROPELLER FOR SHIP, AND ASSEMBLING METHOD AND DISASSEMBLING METHOD THEREFOR

CROSS-REFERENCE TO RELATED APPLICATION

This application is the U.S. National Stage of International Patent Application No. PCT/KR2013/004337 filed on May 16, 2013, which claims priority to Korean Patent Application Nos. 10-2012-0139278 filed on Dec. 3, 2012, 10-2012-0139280 filed on Dec. 3, 2012, 10-2012-0139279 filed on Dec. 3, 2012, and 10-2012-0139858 filed on Dec. 4, 2012, the disclosures of which are hereby incorporated in their entireties by reference.

TECHNICAL FIELD

The present invention relates to a propulsion system for a ship, a method of assembling the same, and a method of disassembling the same.

BACKGROUND ART

Typical propulsion systems for ships have a single spiral propeller. However, the propulsion system equipped with one propeller cannot use rotational energy of a water stream caused by rotation of the propeller as a propulsive force, and thus suffers a great loss of energy.

Contra-rotating propellers (CRP) can recover the rotational energy lost in this way as the propulsive force. In the CRP, two propellers installed on the same axis generate the propulsive force while rotating in opposite directions. The rear propeller recovers the rotational energy of a fluid passing through the front propeller as the propulsive force while rotating reversely. Thus, the CRP can exert higher propulsion performance than the propulsion system equipped with one propeller.

However, the CRP includes a contra-rotating unit for implementing contra-rotation of the two propellers, a hollow shaft, and so on. For this reason, it is relatively difficult to manufacture and install the CRP. The CRP requires a high-tech level in order to maintain reliability and ensure stable operation.

A contra-rotating propulsion system equipped with a planetary gear type contra-rotating unit and a hollow shaft installed in a hull is disclosed in US Patent Application Publication No. 2011/0033296 (entitled CONTRA-ROTATING PROPELLER MARINE PROPULSION DEVICE).

DISCLOSURE

Technical Problem

Embodiments of the present invention are intended to provide a propulsion system for a ship, a method of assembling the same, and a method of disassembling the same, capable of implementing stable contra-rotation of two propellers as well as mounting or demounting the propulsion system from the rear of a hull, and facilitating assembly, disassembly, and maintenance of the propulsion system.

Further, the embodiments of the present invention are intended to provide a propulsion system for a ship, a method of assembling the same, and a method of disassembling the same, capable of displacing a connecting member connecting a contra-rotating device and a front propeller in an axial direction and performing checkup and repair of bearings supporting the front propeller.

Further, the embodiments of the present invention are intended to provide a propulsion system for a ship, a method of assembling the same, and a method of disassembling the same, capable of displacing a rotary shaft a given distance toward the stem of the ship when the propulsion system is disassembled, preventing a contra-rotating device from colliding with a rudder installed at the rear of a rear propeller when the contra-rotating device is separated, and improving efficiency of disassembling work.

Further, the embodiments of the present invention are intended to provide a propulsion system for a ship, a method of assembling the same, and a method of disassembling the same, capable of providing a corrosion-resistant unit using an anode between a hub of a front propeller and a rear end of a hull and/or between the hub of the front propeller and a hub of a rear propeller, and protecting a sealing unit from corrosion caused by sea water.

In addition, the embodiments of the present invention are intended to provide a propulsion system for a ship, a method of assembling the same, and a method of disassembling the same, capable of making a contra-rotating device support thrust of a front propeller and simplifying an installation structure of the front propeller.

Technical Solution

According to an aspect of the present invention, there is provided a propulsion system for a ship, which includes: a rear propeller fixed to a rotary shaft; a front propeller rotatably supported on the rotary shaft in front of the rear propeller; a contra-rotating device mounted in an installation space at a rear end of a hull so as to reverse rotation of the rotary shaft and transmit the reversed rotation to the front propeller; a propeller connecting member configured to connect the contra-rotating device and the front propeller to transmit a rotational force; and a thrust supporting device provided between the contra-rotating device and the propeller connection member to support thrust of the front propeller.

The contra-rotating device may include a gearbox that has an outer surface corresponding to a shape of an inner surface of the installation space and is installed to be slidable from a rear of the hull into the installation space, and a contra-rotating gear unit that is installed in the gearbox and implements reverse rotation of the front propeller.

The propeller connecting member may extend from the front propeller into the gearbox and be connected to the contra-rotating gear unit. The thrust supporting device may include a thrust pad provided to an outer surface of the propeller connecting member, and first and second thrust bearings that are installed in the gearbox and respectively support opposite surfaces of the thrust pad.

The gearbox may include an outer frame having open opposite ends, an inner frame that is disposed at an inner central portion of the outer frame and supports an outer surface of the rotary shaft, a front cover that closes a front opening of the outer frame, a rear cover that closes a rear opening of the outer frame, and a support plate that connects the outer and inner frames to support the inner frame and partitions an internal space of the gearbox into front and rear spaces.

The contra-rotating gear unit may include a sun gear that is rotatably supported on an outer surface of the inner frame in the front space and is connected to the rotary shaft by a shaft connecting member, a plurality of first planetary gears that are disposed outside the sun gear in the front space and are rotated in mesh with the sun gear, a plurality of planetary gear shafts that are connected to the first planetary gears and pass through the support plate to extend toward the rear space, a plurality of second planetary gears that are coupled to the planetary gear shafts in the rear space and are rotated along with the first planetary gears, and a ring gear which is installed in the rear space, in which the second planetary gears is mashed with a toothed portion formed on an inner surface thereof, and which has a connector connected to the propeller connecting member.

The thrust supporting device may include a thrust pad provided to an outer surface of the propeller connecting member, and first and second thrust bearings that are installed in the rear cover and respectively support opposite surfaces of the thrust pad.

The rear cover may include a cage that houses the thrust pad and the first and second thrust bearings, and a cap member that opens and closes one side of the cage.

The gearbox may further include a planetary gear shaft support that extends from the inner frame to an outer side of the rear space and supports the plurality of planetary gear shafts.

The propeller connecting member may include a connecting flange connected to a hub of the front propeller.

The propulsion system may further include: a cylindrical first lining that includes a flange fixed to the connecting flange and is installed on the connecting flange in order to seal between the hub of the front propeller and the rear end of the hull; and a cylindrical first sealing member that is installed on the rear cover so as to be in contact with an outer surface of the first lining.

The contra-rotating gear unit may include a first ring gear that reverses the rotation of the rotary shaft and transmits the reversed rotation to the front propeller. The contra-rotating gear unit may further include a shaft connecting member that connects the first ring gear and the rotary shaft to transmit a rotational force of the rotary shaft to the first ring gear. The shaft connecting member may be connected to the first ring gear in a spline coupling fashion and transmits the rotational force of the rotary shaft to the first ring gear.

The contra-rotating gear unit may include a plurality of first planetary gears that are disposed inside the first ring gear in the front space and are inscribed in the first ring gear, a plurality of planetary gear shafts that are respectively connected to the plurality of first planetary gears and pass through a support plate to extend toward a rear space, a plurality of second planetary gears that are respectively coupled to the plurality of planetary gear shafts in the rear space and are rotated along with the plurality of first planetary gears, a sun gear that is rotatably supported on an outer surface of an inner frame and is rotated with an outer surface thereof meshed with toothed portions of the plurality of first and second planetary gears, a plurality of idle gears that are disposed in the rear space and are rotated in mesh with the plurality of second planetary gears, a second ring gear that is circumscribed around the plurality of idle gears, and a propeller connecting member that connects the front propeller and the second ring gear and receives a rotational force of the second ring gear to transmit the received rotational force to the front propeller.

The first ring gear may include a disc-like first connector connected to the shaft connecting member, and the shaft connecting member may be configured such that an outer circumferential surface of a rear end thereof is connected to an inner circumferential surface of the first connector in a spline coupling fashion, and transmit the rotational force of the rotary shaft to the first ring gear.

The propulsion system may further include a corrosion-resistant unit that is interposed at least one of between the hub of the front propeller and the rear end of the hull and between the hub of the front propeller and a hub of the rear propeller.

The corrosion-resistant unit may include a plurality of anodes that are attached to the flange so as to protrude from the flange and prevent corrosion of the first lining and the first sealing member.

The corrosion-resistant unit may include a corrosion-resistant cover that is interposed between the flange and the connecting flange and covers an outer surface of the connecting flange which is exposed outward from a coupled region of the flange and the connecting flange.

The corrosion-resistant cover may include first fastening holes which have a through-hole shape and to which fixing means for fixing the flange to the connecting flange are fixed, and second fastening holes which have a through-hole shape and to which fixing means for fixing the connecting flange to the hub of the front propeller are fixed.

The corrosion-resistant cover may include a sealing groove to which a sealing member is attached at a position corresponding to an outer coupled region of the connecting flange and the hub of the front propeller.

According to another aspect of the present invention, there is provided a method of assembling a propulsion system for a ship, in which the propulsion system includes: a rear propeller fixed to a rotary shaft; a front propeller rotatably supported on the rotary shaft in front of the rear propeller; a contra-rotating device having a gearbox mounted in an installation space at a rear end of a hull so as to reverse rotation of the rotary shaft and transmit the reversed rotation to the front propeller; and a propeller connecting member configured to connect the contra-rotating device and the front propeller to transmit a rotational force, the method including: (a) putting the gearbox into the installation space to install the contra-rotating device in the installation space; (b) installing the front propeller on the rotary shaft; and (c) installing the rear propeller on the rotary shaft, wherein the step (a) includes a process of assembling the gearbox on an outer surface of the rotary shaft and putting the gearbox into the installation space from a rear of the hull along with the rotary shaft, or a process of connecting the rotary shaft and a driving shaft connected to a drive source installed in the hull and installing the gearbox on the rotary shaft.

The step (a) may include fixing a rear of the gearbox to the installation space, and fixing a front of the gearbox to the installation space.

The step (b) may include coupling a hub of the front propeller and the propeller connecting member.

According to yet another aspect of the present invention, there is provided a method of disassembling a propulsion system for a ship, which includes: (a) separating the rear propeller from the rotary shaft; (b) separating the front propeller from the rotary shaft; (c) displacing the rotary shaft a given distance toward a stem of the ship; and (d) separating the contra-rotating device from the installation space.

The step (c) may include separating an intermediate driving shaft interposed between the rotary shaft and a main driving shaft connected to the drive source installed in the hull, and displacing the rotary shaft a given distance into an empty space from which the intermediate driving shaft is separated before the contra-rotating device is separated.

The step (d) may include unfixing the gearbox fixed to the installation space, fastening bolts to a front fixing member fixing the gearbox to the installation space so as to apply a force to the gearbox, and separating the gearbox from the installation space.

Advantageous Effects

The propulsion system for the ship, the method of assembling the same, and the method of disassembling the same according to the embodiment of the present invention is capable of implementing stable contra-rotation of the two propellers as well as mounting or demounting the propulsion system from the rear of the hull, and facilitating assembly, disassembly, and maintenance of the propulsion system.

Further, it is possible to displace the connecting member connecting the contra-rotating device and the front propeller in an axial direction, and perform checkup and repair of the bearings supporting the front propeller.

Further, it is possible to displace the rotary shaft a given distance toward the stem of the ship when the propulsion system is disassembled, prevent the contra-rotating device from colliding with a rudder installed at the rear of a rear propeller when the contra-rotating device is separated, and improve efficiency of disassembling work.

Further, it is possible to provide the corrosion-resistant unit using the anodes between the hub of a front propeller and the rear end of the hull and/or between the hub of the front propeller and the hub of the rear propeller, and protect the sealing unit from corrosion caused by sea water.

Further, it is possible to make the contra-rotating device support thrust of the front propeller, and simplify an installation structure of the front propeller.

In addition, since the contra-rotating device is installed at the rear end of the hull so as to exclude a hollow shaft as in the related art, it is possible to simplify a power transmission system compared to the related art, reduce a region required for lubrication, and minimize various problems associated with the lubrication.

MODE FOR INVENTION

Figure 1:
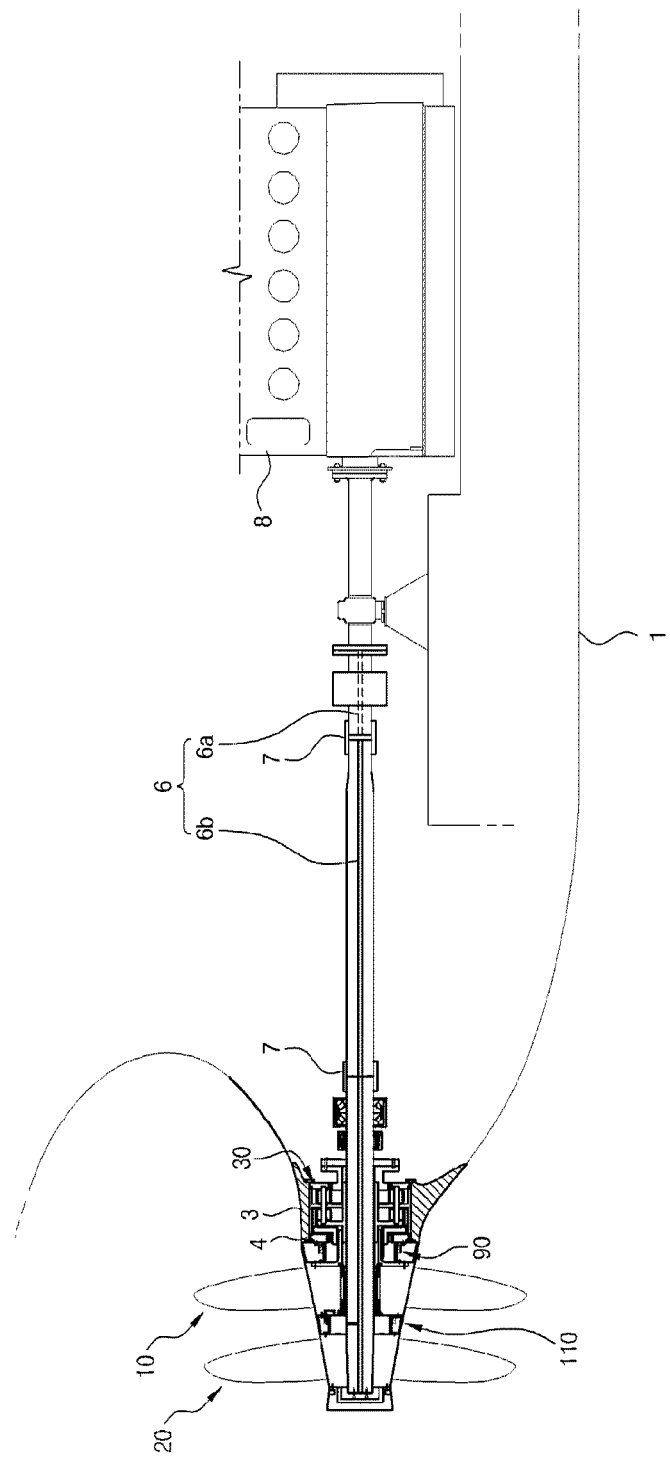
FIG. 1 is a cross-sectional view illustrating a state in which a propulsion system according to a first embodiment of the present invention is applied to a ship.

Hereinafter, embodiments of the present invention will be described in detail with reference to the accompanying drawings. The following embodiments are provided to fully convey the scope of the invention to those skilled in the art. The present invention may, however, be embodied in many different forms and should not be construed as limited to the embodiments set forth herein. In the drawings, the portions irrelevant to the description will not be shown in order to make the present invention clear, and the sizes of the components may be somewhat exaggerated In order to help understanding the present invention.

Figure 2:
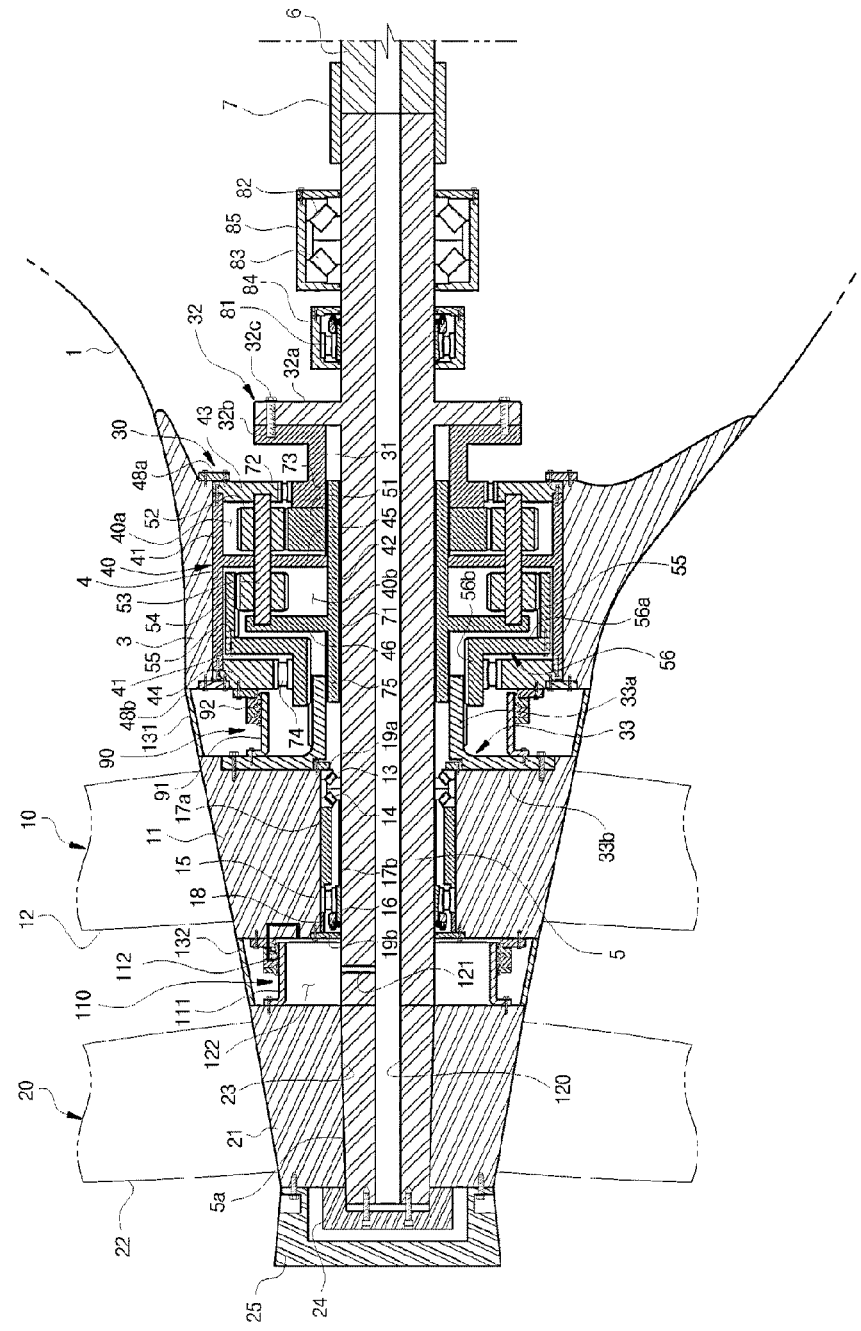
FIG. 2 is a cross-sectional view of the propulsion system according to the first embodiment of the present invention.

As illustrated in FIGS. 1 and 2, a propulsion system for a ship according to a first embodiment of the present invention includes front and rear propellers 10 and 20 that are disposed at the rear of a hull 1 so as to be identical in axis, and a contra-rotating device 30 that is installed in a rear end 3 of the hull 1 in order to implement contra-rotation of the front and rear propellers 10 and 20. That is, the propulsion system is a contra-rotating propulsion system in which the two propellers 10 and 20 generate a propulsive force while rotating in opposite directions.

The rear end 3 of the hull 1 which is mentioned in the first embodiment of the present invention refers to a portion or a stern boss that protrudes rearward from the hull 1 in a streamlined shape in order to install the front and rear propellers 10 and 20 and the contra-rotating device 30. The rear end 3 of the hull may be manufactured by casting, and then be fixed to the hull 1 by welding. Further, the rear end 3 is provided with an installation space 4 passing backward and forward so as to be able to house a gearbox 40 of the contra-rotating device 30 to be described below. An inner surface of the installation space 4 may be machined in a shape corresponding to an external form of the gearbox 40.

Figure 3:
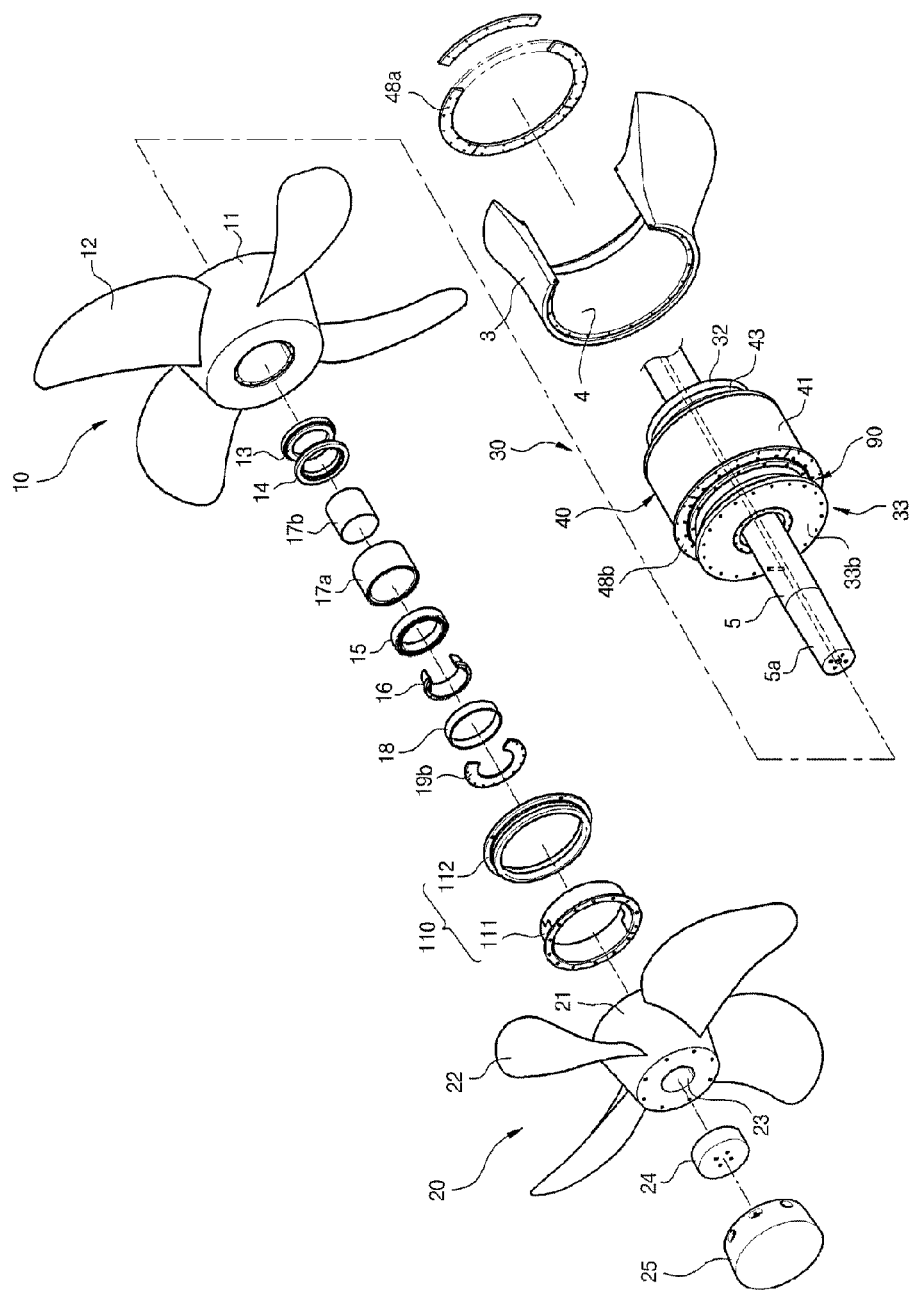
FIG. 3 is an exploded perspective view of the propulsion system according to the first embodiment of the present invention.

As illustrated in FIGS. 2 and 3, the contra-rotating device 30 includes the gearbox 40 that is housed in the installation space of the rear end 3 of the hull 1, a contra-rotating gear unit that is installed in the gearbox 40 and implements opposite rotation of the front propeller 10 (which is rotation opposite to rotation of a rotary shaft 5), and the rotary shaft 5 that is rotatably supported in the gearbox 40 in a state in which it passes through a nearly central portion of the gearbox 40.

A front end of the rotary shaft 5 protrudes forward from the gearbox 40, and is removably connected to a driving shaft 6 in the hull 1. As illustrated in FIG. 1, the driving shaft 6 may be made up of a main driving shaft 6a that is directly connected to a drive source 8 (e.g., a diesel engine, a motor, a turbine, etc.) installed in the hull 1, and an intermediate driving shaft 6b that is interposed between the main driving shaft 6a and the rotary shaft 5. The rotary shaft 5 can be rotated along with the driving shaft 6.

The rear propeller 20 is fixed to the rotary shaft 5 extending rearward from the gearbox 40, and the front propeller 10 is rotatably supported on outer surface of the rotary shaft 5 between the rear propeller 20 and the gearbox 40. The front propeller 10 will be described below in greater detail, but is connected to the contra-rotating device 30. Thereby, when the rotary shaft 5 is rotated, the front propeller 10 can be rotated in the opposite direction to the rear propeller 20.

The intermediate driving shaft 6b is removably connected to the rotary shaft 5 and the main driving shaft 6a in a spline coupling fashion by a coupler 7. The spline coupling is employed herein by way of example, but a coupling fashion is not limited thereto. A flange coupling fashion, a friction clutch fashion, a magnetic clutch fashion, etc. may be selectively employed.

As illustrated in FIGS. 2 and 3, the rear propeller 20 is fixed to the rear of the rotary shaft 5 so as to be rotated along with the rotary shaft 5. The rear propeller 20 includes a hub 21 fixed to the rotary shaft 5, and multiple blades 22 provided on an outer surface of the hub 21. The hub 21 of the rear propeller 20 may be fixed in such a manner that a central shaft coupling hole 23 is forcibly fitted onto the outer surface of the rotary shaft 5. A fixing cap 24 is fastened to a rear end of the rotary shaft 5, and thereby the rear propeller 20 can be more firmly fixed to the rotary shaft 5.

For the coupling, the rear end 5a of the rotary shaft 5 may be formed to have a tapered outer surface whose outer diameter is gradually reduced in a rearward direction, and the shaft coupling hole 23 of the hub 21 may be formed to have a tapered inner surface corresponding to the tapered outer surface of the rear end 5a of the rotary shaft 5. In FIG. 2, a reference number 25 indicates a propeller cap mounted on the hub 21 so as to cover a rear surface of the hub 21 of the rear propeller 20 and the fixing cap 24.

The front propeller 10 is rotatably installed on the outer surface of the rotary shaft 5 between the rear propeller 20 and the contra-rotating device 30. The front propeller 10 includes a hub 11 that is rotatably supported on the outer surface of the rotary shaft 5, and multiple blades 12 provided on an outer surface of the hub 11. The front propeller 10 may be installed on the outer surface of the rotary shaft 5 before the rear propeller 20 is installed. Further, the front propeller 10 is rotated in the opposite direction to the rear propeller 20, and thus a blade angle thereof is opposite to that of the rear propeller 20.

Figure 5:
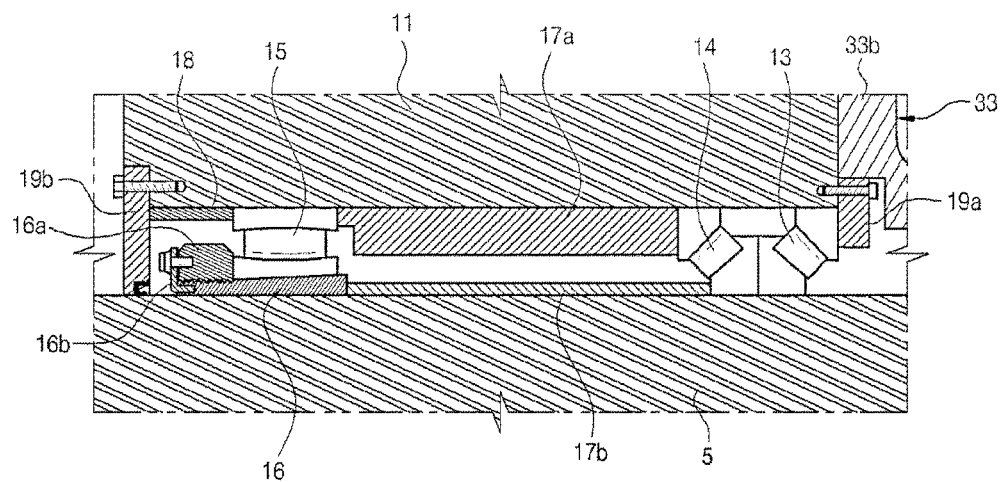
FIG. 5 is a detailed view illustrating a mounting structure of bearings supporting a front propeller of the propulsion system according to the first embodiment of the present invention.

As illustrated in FIGS. 2 and 5, the hub 11 of the front propeller 10 may be rotatably supported on the outer surface of the rotary shaft 5 by a first thrust bearing 13, a second thrust bearing 14, and a first radial bearing 15. The first and second thrust bearings 13 and 14 may be installed between a front inner surface of the hub 11 and the outer surface of the rotary shaft 5, and the first radial bearing 15 may be installed between a rear inner surface of the hub 11 and the outer surface of the rotary shaft 5.

The first radial bearing 15 supports a radial load of the front propeller 10 which acts in a radial direction of the rotary shaft 5, and the first and second thrust bearings 13 and 14 support thrust loads that axially act on the rotary shaft 5 in forward and backward directions. In detail, the second thrust bearing 14 supports a thrust load acting from the front propeller 10 toward the stem in the event of forward movement of the ship, and the first thrust bearing 13 supports a thrust load acting from the front propeller 10 toward the stern in the event of backward movement of the ship.

As illustrated in FIG. 5, an inner ring of the first thrust bearing 13 and an inner ring of the second thrust bearing 14 are disposed to be come into contact with each other, and thereby can be supported not to be pushed in an axial direction. An outer ring of the first thrust bearing 13 is supported by a fixing ring 19a mounted on a front end face of the hub 11, and thereby can also be supported not to be pushed in the axial direction. Cylindrical outer and inner support rings 17a and 17b are installed between the hub 11 of the front propeller 10 and the rotary shaft 5, and thereby the second thrust bearing 14 can be supported not to be pushed in the axial direction. The outer support ring 17a is interposed between an outer ring of the second thrust bearing 14 and an outer ring of the first radial bearing 15 such that these outer rings can be supported. The inner support ring 17b is interposed between the inner ring of the second thrust bearing 14 and an inner ring of the first radial bearing 15 such that these inner rings can be supported. Further, a spacing ring 18 is installed on the inner surface of the hub 11 between the outer ring of the first radial bearing 15 and a sealing cover 19b, and thereby can prevent the outer ring of the first radial bearing 15 from being pushed in the axial direction. The example in which the spacing ring 18 is installed to more stably support the outer ring of the first radial bearing 15 is given herein. However, when the outer ring of the first radial bearing 15 is forcibly fitted onto the inner surface of the hub 11, the outer ring of the first radial bearing 15 can be fixed without installing the spacing ring 18. In other words, the spacing ring 18 may be selectively employed according to design.

As illustrated in FIG. 5, a cylindrical wedge 16 is mounted between the inner ring of the first radial bearing 15 and the outer surface of the rotary shaft 5, and thereby the inner ring of the first radial bearing 15 can be fixed not to be pushed in the axial direction. The wedge 16 has a tapered outer surface whose outer diameter is gradually reduced in the rearward direction, and threads formed on a rear outer surface thereof. An inner surface of the wedge 16 may be forcibly fitted onto the outer surface of the rotary shaft 5. A tightening nut 16a is fastened to the rear threads of the wedge 16, and thereby the wedge 16 can constrain the inner ring of the first radial bearing 15. Therefore, the first radial bearing 15 can be firmly fixed between the outer surface of the rotary shaft 5 and the inner surface of the hub 11. A fixing clip 16b for preventing unloosening may be fastened to the wedge 16 and the tightening nut 16a.

Figure 4:
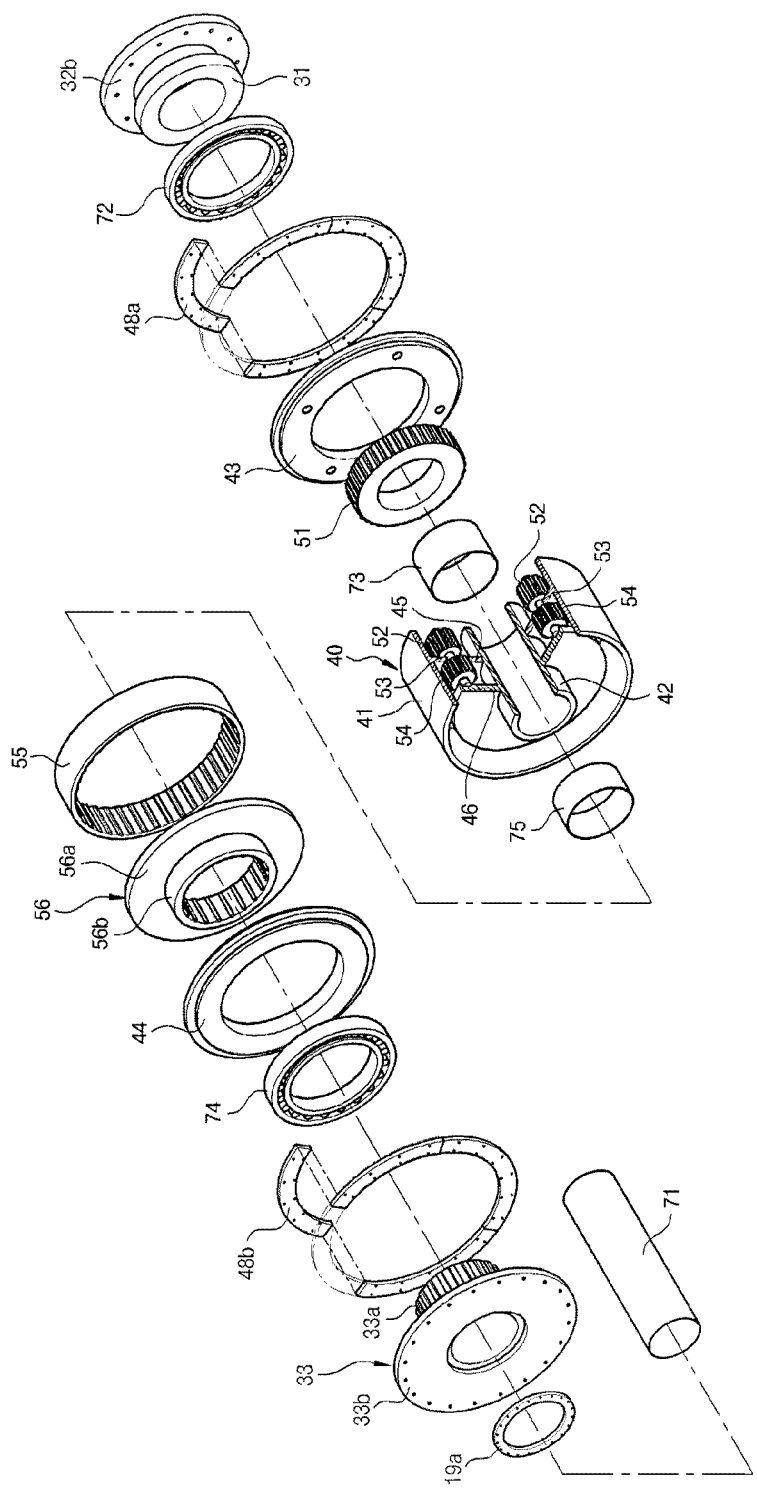
FIG. 4 is an exploded perspective view of a contra-rotating device of the propulsion system according to the first embodiment of the present invention.
Figure 6:
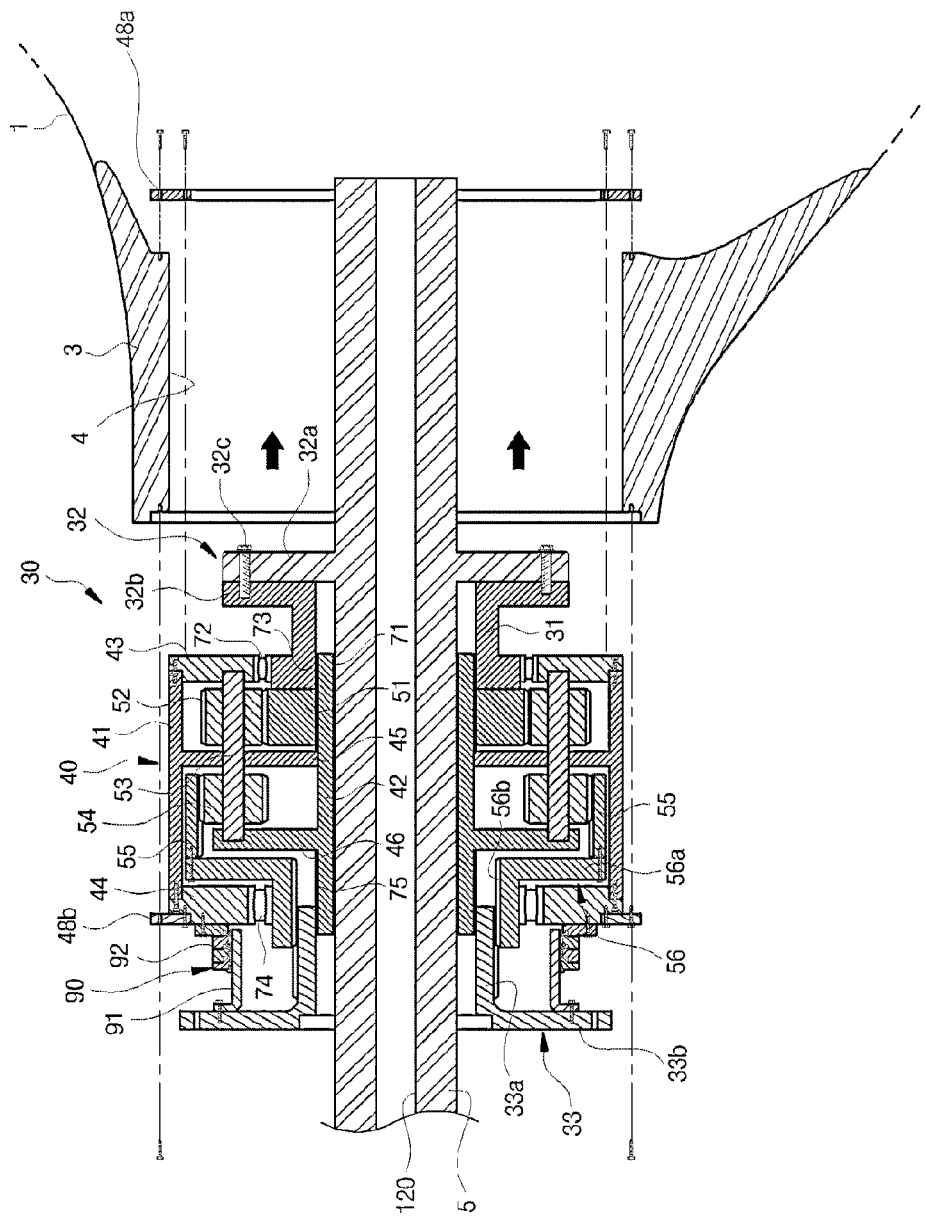
FIG. 6 is a cross-sectional view illustrating an example of mounting the contra-rotating device of the propulsion system according to the first embodiment of the present invention, wherein the contra-rotating device is separated.

As illustrated in FIGS. 2, 4, and 6, the gearbox 40 of the contra-rotating device 30 includes a cylindrical outer frame 41 in which the contra-rotating gear unit (to be described below) is housed and opposite ends of which are open, an inner frame 42 that is disposed at an inner central portion of the outer frame 41 and supports the outer surface of the rotary shaft 5, a front cover 43 that is removably mounted on the outer frame 41 and closes a front opening of the outer frame 41, a rear cover 44 that is removably mounted on the outer frame 41 and closes a rear opening of the outer frame 41, and a support plate 45 that partitions an internal space of the gearbox 40 into front and rear spaces 40a and 40b and connects the outer and inner frames 41 and 42. A cylindrical journal bearing 71 may be installed between the outer surface of the rotary shaft 5 and an inner surface of the inner frame 42 for the purpose of smooth rotation of the rotary shaft 5.

The contra-rotating gear unit inside the gearbox 40 includes a sun gear 51 that is rotatably supported on an outer surface of the inner frame 42 in the front space 40a and is connected to the rotary shaft 5 by a cylindrical shaft connecting member 31, a plurality of first planetary gears 52 that are disposed outside the sun gear 51 in the front space 40a and are rotated in mesh with the sun gear 51, a plurality of planetary gear shafts 53 that are connected to the first planetary gears 52, pass through the support plate 45, and extend toward the rear space 40b, a plurality of second planetary gears 54 that are coupled to the planetary gear shafts 53 in the rear space 40b and are rotated along with the first planetary gears 52, a ring gear 55 that is installed in the rear space 40b and is meshed with the second planetary gears 54 by a toothed portion formed on an inner surface thereof, and a ring gear connector 56 that is connected to the ring gear 55, is rotatably supported on the rear cover 44 of the gearbox 40, and is connected to the front propeller 10 by a cylindrical propeller connecting member 33.

Further, the gearbox 40 is provided with a planetary gear shaft support 46 that extends from the inner frame 42 to an outer side of the rear space 40b and supports one end of each planetary gear shaft 53. That is, the plurality of planetary gear shafts 53 are rotatably supported on the support plate 45 in a state in which middle portions thereof pass through the support plate 45, and opposite ends thereof are rotatably supported on the front cover 43 and the planetary gear shaft support 46 respectively. Therefore, the first planetary gears 52 and the second planetary gears 54 fixed to outer surfaces of the planetary gear shafts 53 can be rotated along with the planetary gear shafts 53. Although not illustrated in the figures, portions at which the planetary gear shafts 53 are supported on the front cover 43, the support plate 45, and the planetary gear shaft support 46 may be mounted with respective bearings for smooth rotation of the planetary gear shafts 53.

The shaft connecting member 31 connecting the sun gear 51 and the rotary shaft 5 is provided in a cylindrical shape, and is installed outside the rotary shaft 5 in such a manner that it passes through the front cover 43. In the shaft connecting member 31, a rear end thereof is connected to the sun gear 51 by fastening multiple fixing bolts (not shown), and a front end thereof is connected to the rotary shaft 5 by a power transmission joint 32 to be described below. Further, the shaft connecting member 31 is rotatably supported by a front bearing 72 installed between the front cover 43 and an outer surface thereof. The sun gear 51 and an inner surface of the shaft connecting member 31 may be rotatably supported by a journal bearing 73 installed on the outer surface of the inner frame 42.

As illustrated in FIGS. 2 and 6, the power transmission joint 32 connecting the rotary shaft 5 and the shaft connecting member 31 may include a driving flange 32a provided for the rotary shaft 5 in front of the gearbox 40, a driven flange 32b provided for the shaft connecting member 31 so as to face the driving flange 32a, and a plurality of connecting bolts 32c that pass through the driving flange 32a to be fastened to the driven flange 32b.

The ring gear connector 56 of the contra-rotating gear unit is provided with a disc-like connector 56a connected to the ring gear 55, and a cylindrical support 56b that extends from the disc-like connector 56a through the rear cover 44 in the rearward direction. The ring gear connector 56 may be formed integrally with or separately from the ring gear 55, and then connected to the ring gear 55 by fastening bolts. The support 56b of the ring gear connector 56 is rotatably supported by a rear bearing 74 installed between the rear cover 44 and an outer surface thereof, and thereby allows the ring gear 55 to be stably rotated.

The propeller connecting member 33 connecting the contra-rotating device 30 and the front propeller 10 is provided with a connecting part 33a which is provided in a cylindrical shape and whose outer surface is coupled to an inner surface of the support 56b of the ring gear connector 56, and a connecting flange 33b that is integrally formed with a rear end of the connecting part 33a and is coupled to the hub 11 of the front propeller 10.

The connecting flange 33b of the propeller connecting member 33 may be fixed to the front end face of the hub 11 of the front propeller 10 by fastening multiple fixing bolts, and the connecting part 33a may be coupled to the inner surface of the support 56b of the ring gear connector 56 so as to be movable in the axial direction. That is, the connecting part 33a of the propeller connecting member 33 and the support 56b of the ring gear connector 56 may be connected in a spline coupling fashion. Further, a cylindrical journal bearing 75 may be installed between the outer surface of the inner frame 42 and an inner surface of the connecting part 33a in order to rotatably support the propeller connecting member 33.

Figure 7:
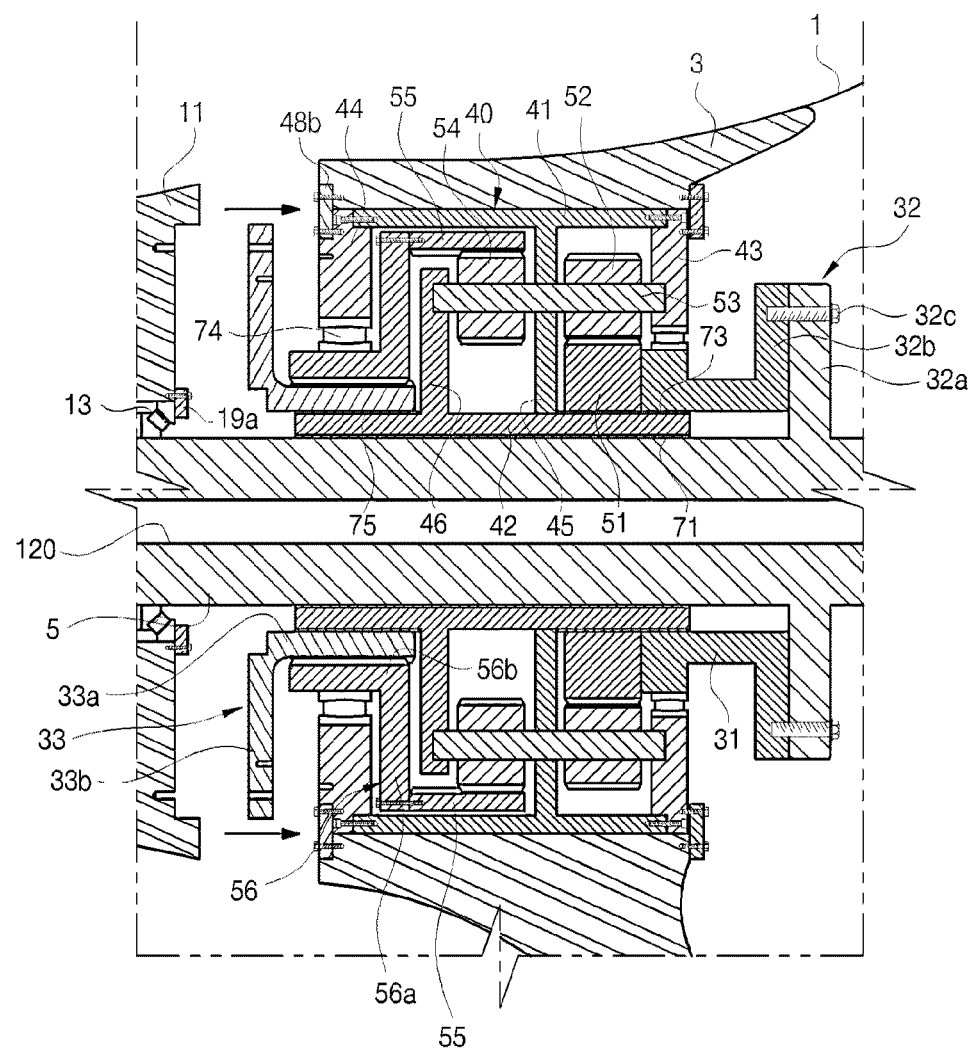
FIG. 7 is a cross-sectional view illustrating a state in which the bearings of the front propeller is checked after a propeller connecting member of the propulsion system according to the first embodiment of the present invention is separated from the front propeller and is displaced in an axial direction.

As illustrated in FIG. 7, such a propeller connecting member 33 allows the connecting flange 33b to move in the axial direction with the connecting flange 33b separated from the hub 11 of the front propeller 10 in addition to a function of transmitting rotational power to the front propeller 10. As such, the propeller connecting member 33 makes possible checkup and maintenance of the first and second thrust bearings 13 and 14 supporting the front propeller 10 in the future without separation of the front propeller 10 and the gearbox 40.

An operation of the contra-rotating device 30 may be as follows.

Rotation of the rotary shaft 5 is transmitted to the sun gear 51 by the shaft connecting member 31. Thus, the sun gear 51 is rotated along with the rotary shaft 5 in the same direction. The rotation of the sun gear 51 is transmitted to the second planetary gears 54 via the planetary gear shafts 53 after being reversed by the first planetary gears 52. That is, the first and second planetary gears 52 and 54 are connected by the planetary gear shafts 53, and thus are rotated together in the opposite direction of the rotary shaft 5. The ring gear 55 is meshed with the second planetary gears 54 by the toothed portion formed on the inner surface thereof, and thus is rotated in the same direction as the second planetary gears 54 (in the opposite direction of the rotary shaft). The rotation of the ring gear 55 is transmitted to the front propeller 10 by the ring gear connector 56 and the propeller connecting member 33. Therefore, it is possible to implement contra-rotation of the front and rear propellers 10 and 20.

In this contra-rotating device 30, the gearbox 40 can ensure stable rotation of the first and second planetary gears 52 and 54 because the support plate 45 and the planetary gear shaft support 46 stably support the plurality of planetary gear shafts 53. Further, a middle portion of the inner frame 42 is supported on the outer frame 41 by the support plate 45, and opposite ends of the inner frame 42 are also supported by the front and rear covers 43 and 44. As such, the rotary shaft 5 can be stably supported.

In other words, the inner frame 42 is supported by the support plate 45, the front cover 43, and the rear cover 44, and widely supports an outer surface of the journal bearing 71 installed on the outer surface of the rotary shaft 5. As such, even when a high load is applied to the rotary shaft 5, the inner frame 42 can stably support the rotary shaft 5, and thus a smooth operation of the propulsion system can be implemented.

Further, as illustrated in FIG. 2, the propulsion system of the first embodiment of the present invention includes a first sealing unit 90 that seals a gap between the rear end 3 of the hull and the hub 11 of the front propeller 10 so as to prevent intrusion of sea water (or fresh water) or foreign materials, and a second sealing unit 110 that seals a gap between the hub 11 of the front propeller 10 and the hub 21 of the rear propeller 20 for the same purpose.

Figure 8:
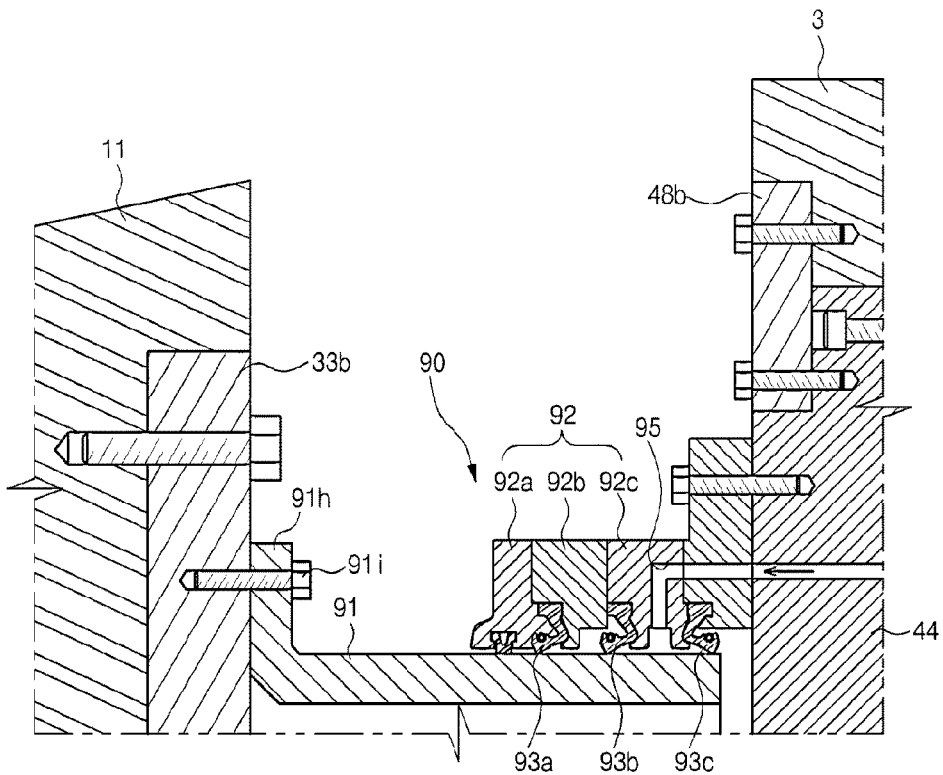
FIG. 8 is a cross-sectional view of a first sealing unit of the propulsion system according to the first embodiment of the present invention.

As illustrated in FIG. 8, the first sealing unit 90 may include a cylindrical first lining 91 that is installed on a connecting flange 33b of the propeller connecting member 33 fixed to the front end face of the hub 11 of the front propeller, and a cylindrical first sealing member 92 that covers an outer surface of the first lining 91 so as to be in contact with the outer surface of the first lining 91 and is fixed to the rear cover 44 at one end thereof.

The first sealing member 92 includes multiple packings 93a, 93b, and 93c that are installed on an inner surface thereof which is opposite to the first lining 91 with a gap, and a channel 95 that supplies a sealing fluid to the gap for the packings 93a, 93b, and 93c. The channel 95 of the first sealing member 92 may be connected to a lubricant feed channel led to the gearbox such that a lubricant can be fed under predetermined pressure. The pressurized lubricant is fed to the gap for the packings 93a, 93b, and 93c, and comes into close contact into the packings 93a, 93b, and 93c toward the first lining 91 under pressure, thereby preventing intrusion of sea water and foreign materials.

Figure 9:
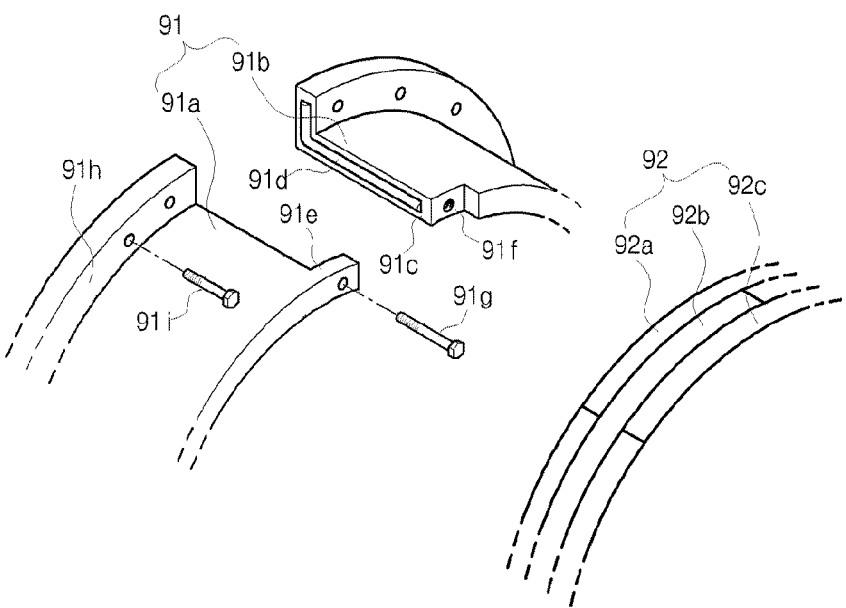
FIG. 9 is an exploded perspective view of the first sealing unit of the propulsion system according to the first embodiment of the present invention.

As illustrated in FIG. 9, the first lining 91 may be made up of a first member 91a and a second member 91b divided in semi-circular shapes. A packing 91d may be interposed between ends 91c of the divided first and second members 91a and 91b so as to be sealed when the first and second members 91a and 91b are coupled to each other. Further, the end of the first member 91a is provided with a first tie 91e protruding outwards, and the end of the second member 91b is provided with a second tie 91f corresponding to the first tie 91e. A fixing bolt 91g is fastened to the first and second ties, and thereby the first and second members can be firmly coupled to each other. The first lining 91 has a flange 91h that is fixed to the connecting flange 33b. A plurality of fixing bolts 91i are fastened to the connecting flange 33b via the flange 91h, and thereby the first lining can be firmly fixed to the hub 11. The example in which the first lining 91 is divided into the two parts for easy installation of the first lining 91 is given herein. However, the first lining 91 is not limited thereto, and it may have a cylindrical shape in which the first and second members 91a and 91b are integrally formed.

In the case of the first sealing member 92, multiple rings 92a, 92b and 92c formed in a semicircular shape may also be fixedly stacked outside the first lining 91 in a lengthwise direction of the rotary shaft 5. The multiple rings 92a, 92b and 92c may be bonded to each other by fastening bolts or by welding.

Figure 10:
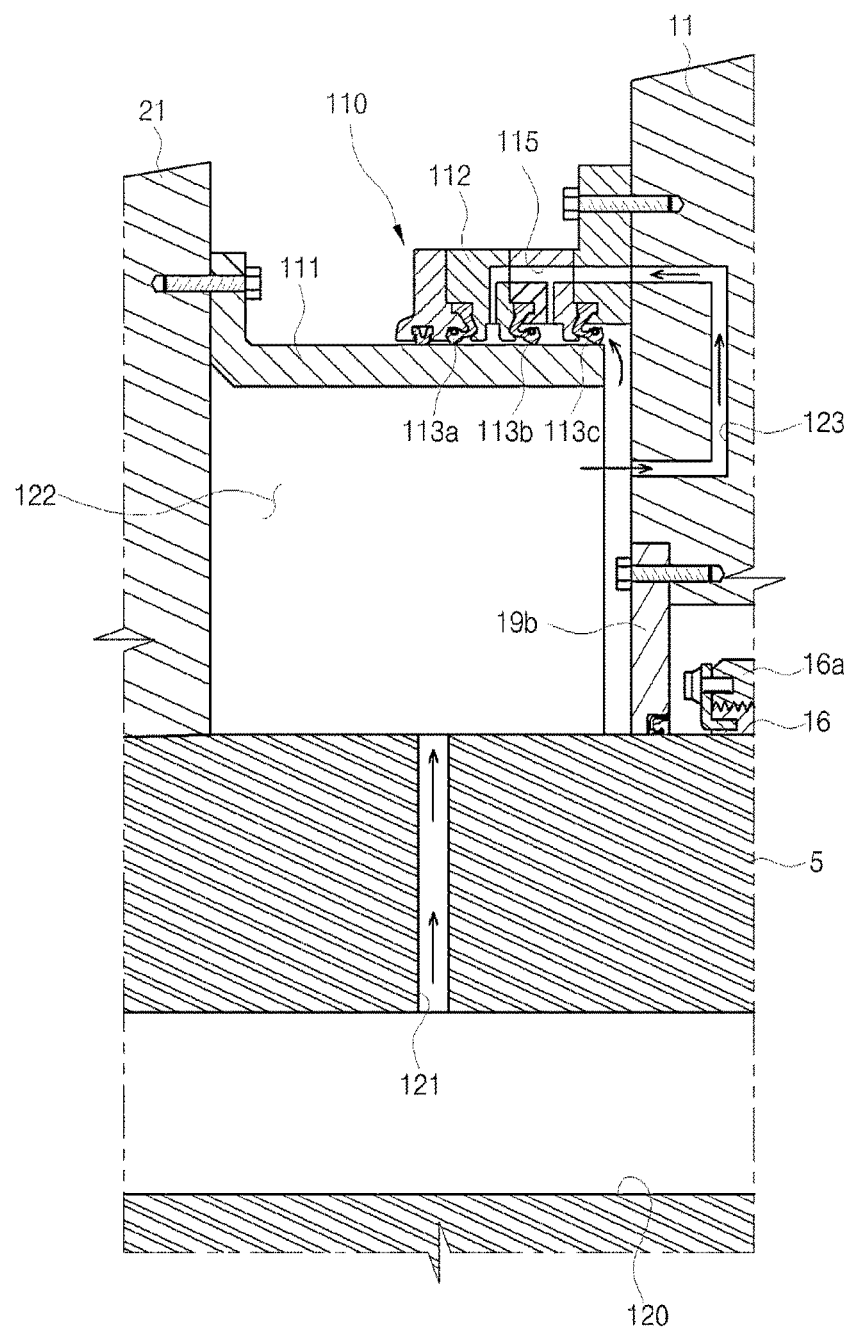
FIG. 10 is a cross-sectional view of a second sealing unit of the propulsion system according to the first embodiment of the present invention.

As illustrated in FIG. 10, a second sealing unit 110 may include a cylindrical lining 111 installed on a front end face of the hub 21 of the rear propeller, and a cylindrical second sealing member 112 which covers an outer surface of the second lining 111 so as to come into contact with the outer surface of the second lining 111 and one end of which is fixed to a rear end face of the hub 11 of the front propeller. Like the first sealing member 92, the second sealing member 112 is also provided with a plurality of packings 113a, 113b, and 113c that are installed on an inner surface thereof, and a channel 115 that supplies a fluid to a gap for the packings 113a, 113b, and 113c.

The channel 115 of the second sealing member 112 may communicate with a lubricant feed channel 120 provided in the center of the rotary shaft 5. To this end, the rotary shaft 5 may have a first connecting channel 121 that is formed in a radial direction and connects the lubricant feed channel 120 and an inner space 122 of the second lining 111. The hub 11 of the front propeller may be provided with a second connecting channel 123 that connects the inner space 122 of the second lining 111 and the channel 115 of the second sealing member 112. Therefore, a lubricant supplied from the rotary shaft 5 to the second sealing member 112 can pressurize the packings 113a, 113b, and 113c, and thereby realize sealing.

Like the first lining 91 and the first sealing member 92, the second lining 111 and the second sealing member 112 are also formed in a semicircular shape, and may be coupled after the rear propeller 20 is installed.

As illustrated in FIG. 2, the propulsion system of the first embodiment of the present invention may include a second radial bearing 81, a third thrust bearing 82, and a fourth thrust bearing 83, all of which support the rotary shaft 5 in front of the gearbox 40. The second radial bearing 81 may be fixed in the hull 1 after being housed in a first bearing case 84. The third and fourth thrust bearings 82 and 83 may be fixed in the hull 1 after being housed in a second bearing case 85 in a such a manner that inner rings thereof are supported mutually.

The second radial bearing 81 supports the rotary shaft 5 in front of the gearbox 40 so as to prevent radial vibrations or shakes of the rotary shaft 5. The third and fourth thrust bearings 82 and 83 function to transmit an axial force, which is transmitted from the front and rear propellers 10 and 20 to the rotary shaft 5, to the hull 1. Especially, the third thrust bearing 82 functions to transmit a force, which acts from the rotary shaft 5 in a stem direction, to the hull 1 in the event of the forward movement of the ship. The fourth thrust bearing 83 functions to transmit a force, which acts from the rotary shaft 5 in a stern direction, to the hull 1 in the event of the backward movement of the ship.

In FIG. 2, a reference number 131 indicates a first covering that covers a space outside the first sealing unit 90 between the rear end 3 of the hull and the hub 11 of the front propeller, a reference number 132 indicates a second covering that covers a space outside the second sealing unit 110 between the hub 11 of the front propeller and the hub 21 of the rear propeller. The first covering 131 is installed in such a manner that it is fixed to the rear end 3 of the hull and is slightly spaced apart from the hub 11 of the front propeller, or that it is slightly spaced apart from the rear end 3 of the hull and is fixed to the hub 11 of the front propeller 10. In the latter case, the first covering 131 can be rotated along with the front propeller 10. The second covering 132 is also fixed to any one of the hub 11 of the front propeller and the hub 21 of the rear propeller. In this state, the second covering 132 can be rotated along with the fixed hub.

Next, a method of assembling the propulsion system according to the first embodiment of the present invention to the hull will be described.

As illustrated in FIG. 6, when the propulsion system is installed, the gearbox 40 and the contra-rotating gear unit constituting the contra-rotating device 30 are assembled first before the propulsion system is mounted in the hull 1. In this state, the propulsion system is coupled on the outer surface of the rotary shaft 5. That is, before the contra-rotating device 30 is mounted in the hull 1, the contra-rotating device 30 is previously coupled to the rotary shaft 5.

In this way, the contra-rotating device 30 may be assembled after being manufactured outside the hull 1, and be previously coupled to the rotary shaft 5. As such, exquisite manufacturing and assembly are possible. Further, the first sealing unit 90 that can be usually mounted after the front propeller 10 is installed can be previously mounted on the contra-rotating device 30. As such, it is possible to simplify a process of installing the propulsion system in the hull 1.

The rotary shaft 5 and the contra-rotating device 30 assembled at a factory are transported to a dock, etc. where the hull 1 is manufactured using a transporting means, and then can be mounted on the rear end 3 of the hull 1. In this case, a hoist such as a crane capable of lifting an assembly of the contra-rotating device 30 can be used. When the contra-rotating device 30 is mounted, the gearbox 40 of the contra-rotating device 30 is slidably put from the rear of the hull 1 into the installation space 4 of the rear end 3 of the hull, and is aligned such that the center of the rotary shaft 5 and the center of the driving shaft 6 are identical to each other. As another example, the installation space 4 may be provided in a tapered shape in which a diameter thereof is gradually reduced in a direction in which the gearbox 40 is put. In this case, the gearbox 40 may be forcibly fitted into the installation space 4. Here, a zip plate, a hydraulic ram, etc. are installed in the rear of the gearbox 40, and the gearbox 40 can be hydraulically pushed into the installation space 4.

After the contra-rotating device 30 is put into and aligned in the installation space 4 of the rear end 3 of the hull, front and rear fixing members 48a and 84b are respectively installed in the front and rear of the gearbox 40 as illustrated in FIG. 2, and the gearbox 40 is fixed to the rear end 3 of the hull. The front and rear fixing members 48a and 84b may be divided into multiple parts. The front and rear fixing members 48a and 84b may be fixed to the structures, i.e. the gearbox 40 and the rear end 3 of the hull, by fastening multiple fixing bolts.

The rear fixing member 48b can be mounted by a worker who goes near from the rear of the hull 1, and the front fixing member 48a can be mounted by a worker who goes near from the interior of the hull 1. The contra-rotating device 30 mounted in a way that enters the installation space 4 of the rear end 3 of the hull in this way can be separated from the hull 1 when getting out of order in the future, and be repaired in a separated state. Therefore, repairs can be easily made.

The first embodiment of the present invention is given the example in which the front and rear fixing members 48a and 84b are fastened to the front and rear of the gearbox 40 in order to firmly fix the gearbox 40. When the gearbox 40 is put into the installation space 4, the outer surface of the gearbox 40 is kept supported on the inner surface of the installation space 4. For this reason, the gearbox 40 may be fixed to the rear end 3 of the hull by fastening the rear fixing member 48b only.

After the gearbox 40 may be fixed to the rear end 3 of the hull, the intermediate driving shaft 6b and the rotary shaft 5 are connected by a coupling unit 7, and the second radial bearing 81 and the third and fourth thrust bearings 82 and 83 are installed inside the hull 1 such that the rotary shaft 5 can be supported on the hull 1.

As illustrated in FIGS. 1 and 2, after the contra-rotating device 30 is mounted on the rear end 3 of the hull, the front and rear propellers 10 and 20 and their relevant parts are mounted on the rotary shaft 5, and the second sealing unit 110 is mounted. Thereby, the installation of the propulsion system can be finished. Here, when the front propeller 10 is coupled, a process of coupling the hub 11 of the front propeller and the propeller connecting member 33 (see FIG. 2) is performed.

Further, in the propulsion system according to the first embodiment of the present invention, the checkup or maintenance of the first and second thrust bearings 13 and 14 supporting the front propeller 10 can be performed without separating the gearbox 40 of the contra-rotating device 30 and the front propeller 10. In this case, as illustrated in FIG. 7, after the first covering 131 and the first sealing unit 90 are separated, the connecting flange 33b of the propeller connecting member 33 is separated from the hub 11 of the front propeller 10, and the propeller connecting member 33 is pushed and displaced toward the gearbox 40. In this state, a worker approaches a separated space between the hub 11 of the front propeller and the connecting flange 33b, and can perform the checkup or maintenance of the first and second thrust bearings 13 and 14.

Subsequently, a process of disassembling the aforementioned propulsion system from the hull 1 will be described with reference to FIGS. 11 to 13. The process of disassembling the propulsion system can be performed in the reverse order of the process of installing the propulsion system.

First, the propeller cap 25 (see FIG. 2) mounted on the hub 21 of the rear propeller so as to cover the fixing cap 24 (see FIG. 2) that is fastened to the rear end face of the hub 21 of the rear propeller and the rear end of the rotary shaft 5 is separated, and then the fixing cap 24 is separated. Here, a separating device to be described below may be used.

Next, the rear propeller 20 is separated from the rotary shaft 5. When the rear propeller 20 is separated, a process of releasing the coupling between the second lining 111 (see FIG. 2) and the hub 21 of the rear propeller may be performed first. Here, the separating device shown in FIG. 11 may be used.

Subsequently, referring to FIG. 11, the front propeller 10 is separated from the rotary shaft 5. When the front propeller 10 is separated, a process of releasing the coupling between the hub 11 of the front propeller and the propeller connecting member 33 (see FIG. 2) may be performed first.

Figure 11:
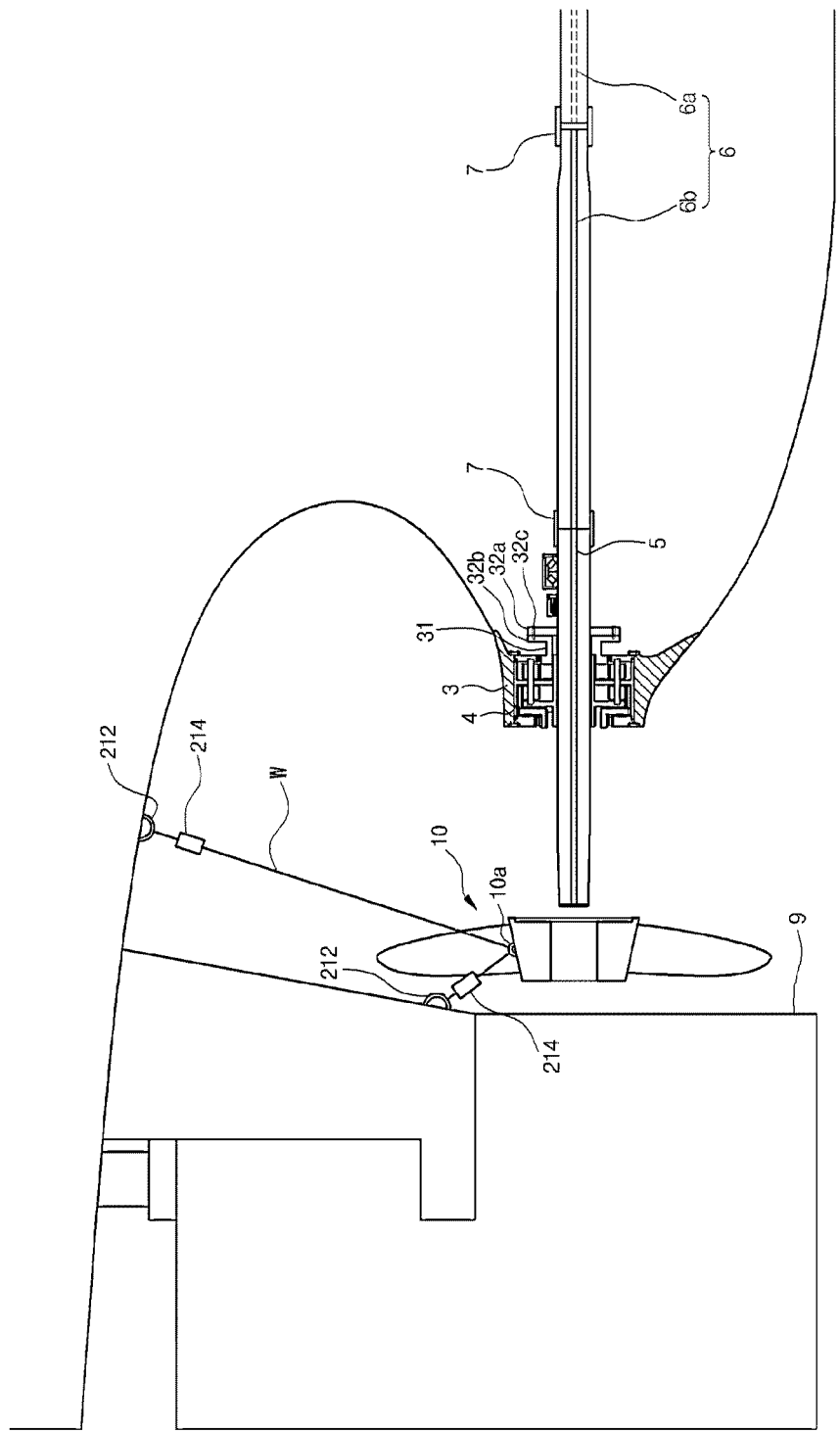
FIGS. 11 to 13 illustrate a main process of disassembling the propulsion system of FIG. 1 from a hull.

As illustrated in FIG. 11, the separating device includes multiple lugs 212 that are fixed to the bottom of the hull 1 above the rear end 3 of the hull and a front face of a rudder 9 located behind the rear propeller 20, lifting units 214, and a wire W. The wire W is connected to the lugs 212 and the lifting units 214, and is fastened to a fastening ring 10a provided for each of the propeller cap 25, the fixing cap 24, the rear propeller 20, the front propeller 10, and the gearbox 40. A worker can separate the propulsion system from the hull 1 while properly adjusting and pulling the wire W connected to the lugs 212 installed on the bottom of the hull 1 and the front face of the rudder 9. Here, the lifting unit 214 may include a sheave, a roller, and so on, and be controlled by a controlling means. Thus, the worker can control the lifting units 214 using the controlling means, and properly pull the wire W to separate the propulsion system from the hull 1. For reference, the separating device is briefly illustrated in FIG. 11 in order to help understanding. The worker can separate the propulsion system from the hull 1 using various hoists such as a crane together.

Figure 12:
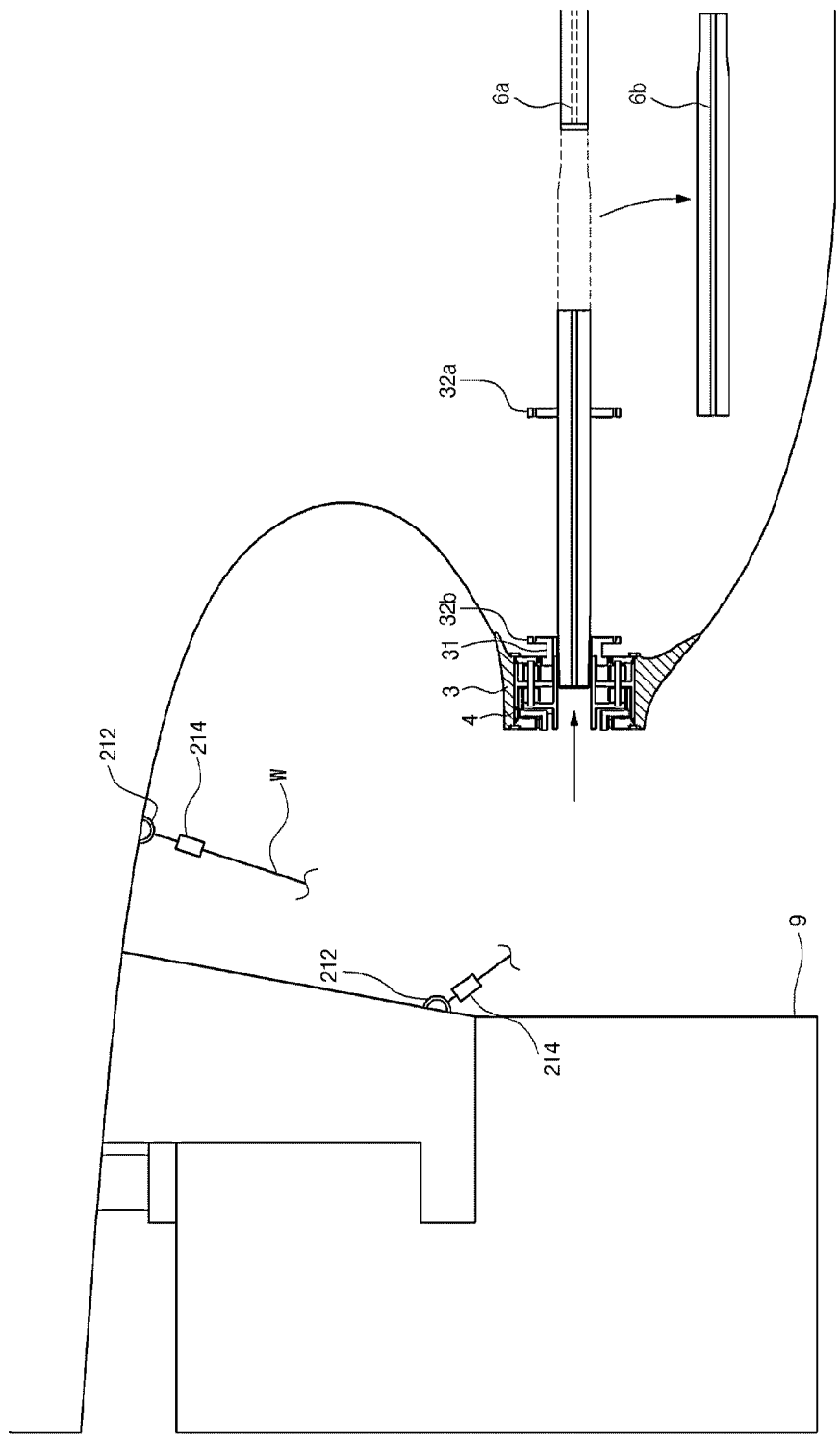

Next, referring to FIG. 12, the rotary shaft 5 is displaced a given distance toward the stem. This is intended to prevent potential collision between the contra-rotating device 30 and the rudder 9 due to a length of the rotary shaft 5 when the contra-rotating device 30 is separated without a delay as in FIG. 11.

To this end, the intermediate driving shaft 6b interposed between the rotary shaft 5 and the main driving shaft 6a connected to the drive source 8 is separated by uncoupling the coupling unit 7, and then the rotary shaft 5 is displaced a given distance into an empty space from which the intermediate driving shaft 6b is separated. Here, a process of releasing the connection between the shaft connecting member 31 and the rotary shaft 5 may be performed first. To this end, the connecting bolts 32c fastening the driving flange 32a provided for the rotary shaft 5 and the driven flange 32b provided for the shaft connecting member 31 so as to face the driving flange 32a are unfastened. Further, a process of removing the respective components indicated by the reference numbers 81 to 85 is performed. This work sequence may be modified depending on convenience of the worker.

Afterwards, the contra-rotating device 30 is separated from the installation space 4 using the aforementioned separating device. Here, a process of unfixing the gearbox 40 fixed in the installation space 4, and a process of fastening bolts 218 (see FIG. 13) to apply a force to the gearbox 40 and separating the gearbox 40 from the installation space 4 may be performed. The process of unfixing the gearbox 40 fixed in the installation space 4 may be performed by unfastening the fixing bolts that are fastened to the front and rear covers 43 and 44 and fix the front and rear of the gearbox 40 in the installation space 4.

Figure 13:
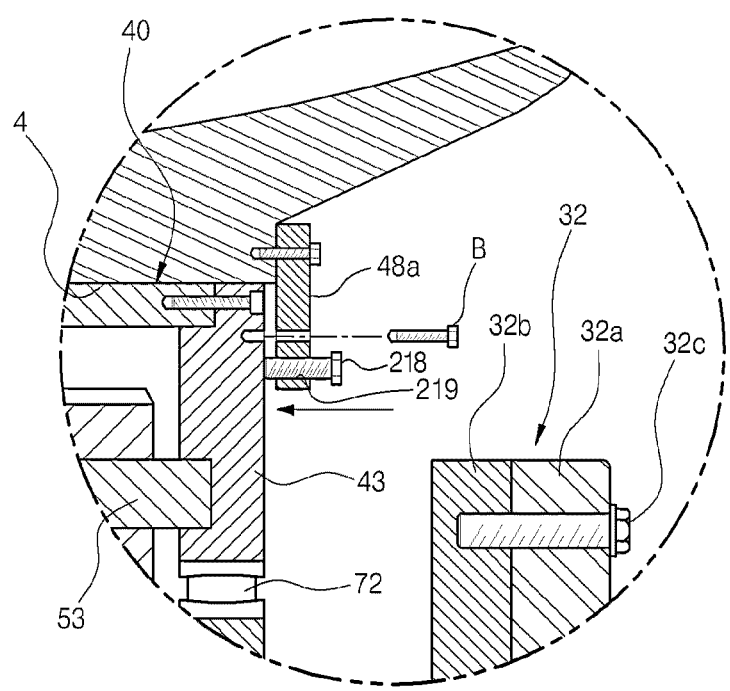

FIG. 13 illustrates a process of fastening bolts 218 to apply a force to the gearbox 40 and separating the gearbox 40 from the installation space 4. The aforementioned installation space 4 is provided, for instance, in a tapered shape in which a diameter thereof is gradually reduced in a direction in which the gearbox 40 enters, and the gearbox 40 may be forcibly fitted into the installation space 4. In this case, it is very difficult to separate the gearbox 40 having a high dead load from the installation space 4.

For this reason, although not illustrated in the other figures, for convenience of description, the front fixing member 48a may be provided with separation holes 219 to which the bolts 218 are fastened. After the rear of the gearbox 40 is unfastened, the fixing bolts B used to couple the front cover 43 and the front fixing member 48a are unfastened. The bolts 218 are fastened to the separation holes 219 so as to apply a force to the gearbox 40, and thereby the gearbox 40 can be separated from the installation space 4. The bolts 218 fastened to the separation holes 219 may include jack bolts, or the like.

The separation of the gearbox 40 from the installation space 4 by fastening the bolts 218 in this way can be defined as connoting a meaning that the gearbox 40 is spaced apart a given distance from the installation space 4 by fastening the bolts 218. Thus, the wire W of the aforementioned separation device is connected to the gearbox 40 spaced apart a given distance from the installation space 4 by the bolts 218, and can completely separate the gearbox 40 from the hull 1.

In the first embodiment described above, the example in which the gearbox 40 is separated from the installation space 4 in a way that pushes the gearbox 40 from the front to the rear to a given distance by fastening the bolts 218 to apply a force to the gearbox 40 has been described, but the present invention is not limited thereto. For example, after a bolt to which the wire W is connected is fastened to the rear of the gearbox 40, the wire W may be pulled backward to separate the gearbox 40 from the installation space 4. In addition to this, various methods of fastening the wire W to a connecting ring formed in the rear of the gearbox 40 and pulling the wire W may be used.

Next, an operation of the propulsion system according to the first embodiment of the present invention will be described.

In the propulsion system, when the rotary shaft 5 is rotated by an operation of the drive source 8 in the hull 1, the rear propeller 20 directly connected to the rear end of the rotary shaft 5 is rotated together in the same direction as the rotary shaft 5. Simultaneously, the sun gear 51 of the contra-rotating device 30 is also rotated along with the rotary shaft 5 because it is connected to the rotary shaft 5 by the shaft connecting member 31. The rotation of the sun gear 51 is transmitted to the second planetary gears 54 via the planetary gear shafts 53 after being reversed by the first planetary gears 52. The ring gear 55 is meshed with the second planetary gears 54 by the toothed portion formed on the inner surface thereof, and thus is rotated in the same direction as the second planetary gears 54 (i.e., in the opposite direction of the rotary shaft). The rotation of the ring gear 55 is transmitted to the front propeller 10 by the ring gear connector 56 and the propeller connecting member 33. Therefore, the front propeller 10 is rotated in the opposite direction to the rear propeller 20.

The front and rear propellers 10 and 20 that are rotated in the opposite direction to each other have blade angles opposite to each other, and thus generate a propulsive water stream in the same direction. That is, the propulsive water stream is generated backward when the ship goes ahead, and forward when the ship goes astern while the front and rear propellers 10 and 20 are rotated in the opposite direction to each other. The propulsive water stream generated when the ship goes ahead improves propulsive performance, because the rear propeller 20 recovers rotational energy of a fluid passing through the front propeller 10 as a propulsive force while rotating reversely. This is equally true of when the ship goes astern.

Meanwhile, since the front propeller 10 generates the backward propulsive water stream when the ship goes ahead, the front propeller 10 receives a repulsive force corresponding to the backward propulsive water stream. This repulsive force is transmitted to the rotary shaft 5 via the second thrust bearing 14, and acts as the propulsive force. Since the rear propeller 20 generates the backward propulsive water stream when the ship goes ahead, the rear propeller 20 also receives a repulsive force. This repulsive force is also transmitted to the directly connected rotary shaft 5, and acts as the propulsive force.

When the ship goes astern, the propulsive force of the front propeller 10 is transmitted to the rotary shaft 5 via the first thrust bearing 13, and the propulsive force of the rear propeller 20 is also transmitted to the directly connected rotary shaft 5.

In the result, in the propulsion system of the first embodiment of the present invention, the propulsive forces generated by the operations of the front and rear propellers 10 and 20 when the ship goes ahead and astern are transmitted to the rotary shaft 5. Further, the propulsive forces transmitted to the rotary shaft 5 are transmitted to the hull 1 via the third and fourth thrust bearings 82 and 83, and thus the hull 1 is propelled.

The specific embodiment has been illustrated and described above. However, the present invention is not limited to the aforementioned embodiment. It will be apparent to those skilled in the art that various modifications or alterations can be contrived and implemented without departing from the scope and spirit of the invention as described in the accompanying claims. For example, in the aforementioned embodiment, the example in which a radial roller bearing is employed as the front and rear bearings 72 and 74 is given, and the example in which the respective journal bearings 71, 73 and 75 are employed between the rotary shaft 5 and the inner frame 42, between the inner frame 42 and the shaft connecting member 31, and between the inner frame 42 and the propeller connecting member 33 is given, but types of the bearings applied to the contra-rotating device 30 are not limited thereto. As long as the bearing can implement rotatable connection between the components, it may be adequately selected from various types of bearings.

Further, in the aforementioned embodiment, the example in which the contra-rotating device 30 is coupled to the rotary shaft 5 and then is assembled is given, but the assembling method is not limited thereto. When the journal bearing 71 is installed between the inner frame 42 of the contra-rotating device 30 and the rotary shaft 5, the rotary shaft 5 may be installed first, and then the assembled contra-rotating device 30 may be installed.

As illustrated in FIGS. 14 to 17, a corrosion-resistant unit may be interposed between the hub 11 of the front propeller in which the first sealing member 92 and the first lining 91 of FIGS. 8 and 10 are installed and the rear end 3 of the hull and/or between the hub 11 of the front propeller in which the second sealing unit 110 and the second lining 111 of FIGS. 8 and 10 are installed and the hub 21 of the rear propeller. The corrosion-resistant unit includes anodes 210 and a corrosion-resistant cover 220.

Figure 14:
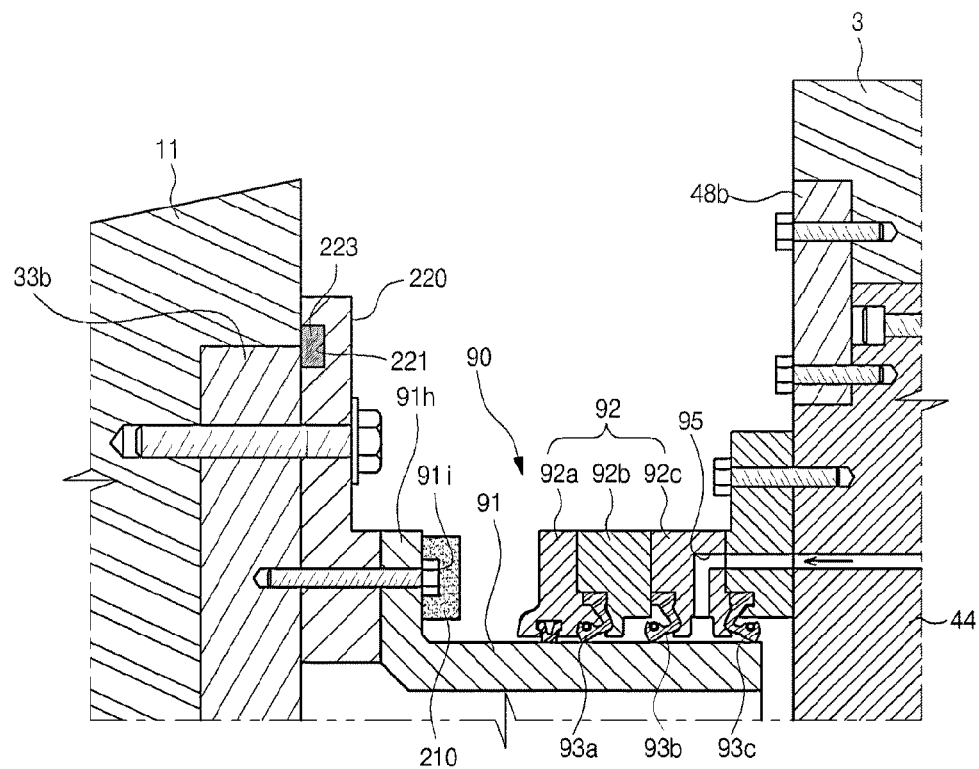
FIG. 14 is a cross-sectional view illustrating an example in which a corrosion-resistant unit is installed between a hub of the front propeller in which the first sealing unit of FIG. 8 is installed and a rear end of the hull.
Figure 15:
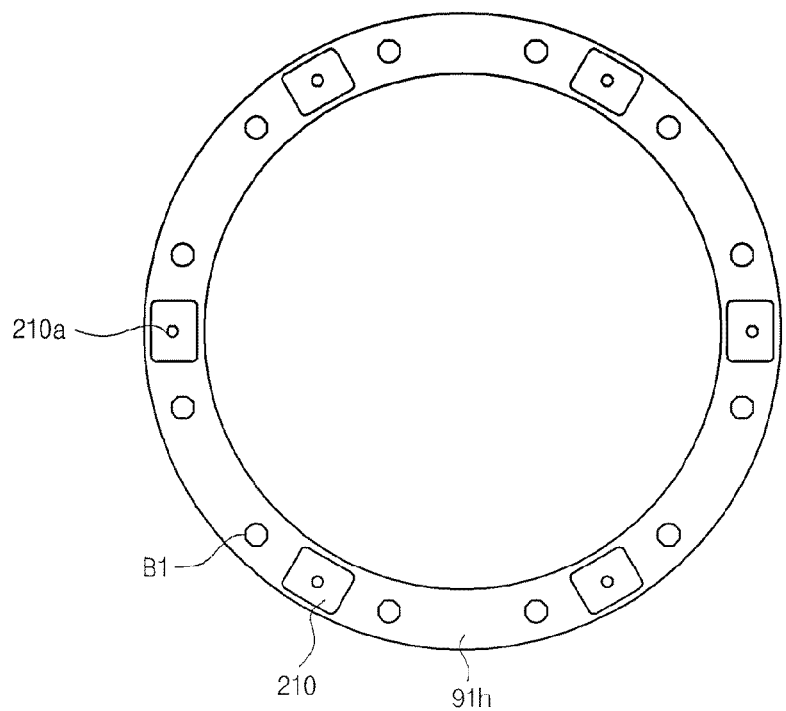
FIG. 15 is a cross-sectional view illustrating an example in which anodes are attached to a flange of a first lining of the corrosion-resistant unit of FIG. 14.

Referring to FIGS. 14 and 15, the anodes 210 are attached to the flange 91*h* of the first lining 91 so as to protrude from the flange 91*h*, and prevent corrosion of the first lining 91 and the first sealing member 92. The anodes 210 may be fixed to the flange 91*h* by fixing means such as fixing screws 210*a*, fixing bolts, or pins. The flange 91*h* of the first lining 91 is provided with fastening holes B1 to which multiple fixing bolts 91*i* are fastened, and the anodes 210 may be interposed between the fastening holes B1 at regular intervals.

Each anode 210 may be provided as, for instance, a quadrilateral plate, and be formed of at least one of a zinc-based material and an aluminum-based material. Each anode 210 may be formed of a metal having a lower potential than the flange 91*h* and the first sealing member 92. An electric reaction occurs between the flange 91*h* and the anode 210 and between the first sealing member 92 and the anode 210, and ions of the low-potential metal migrate to the flange 91*h* and the first sealing member 92. Here, the anodes 210 are sacrificially consumed instead of the flange 91*h* and the first sealing member 92, and prevent the flange 91*h* and the first sealing member 92 from being corroded away by sea water.

Figure 17:
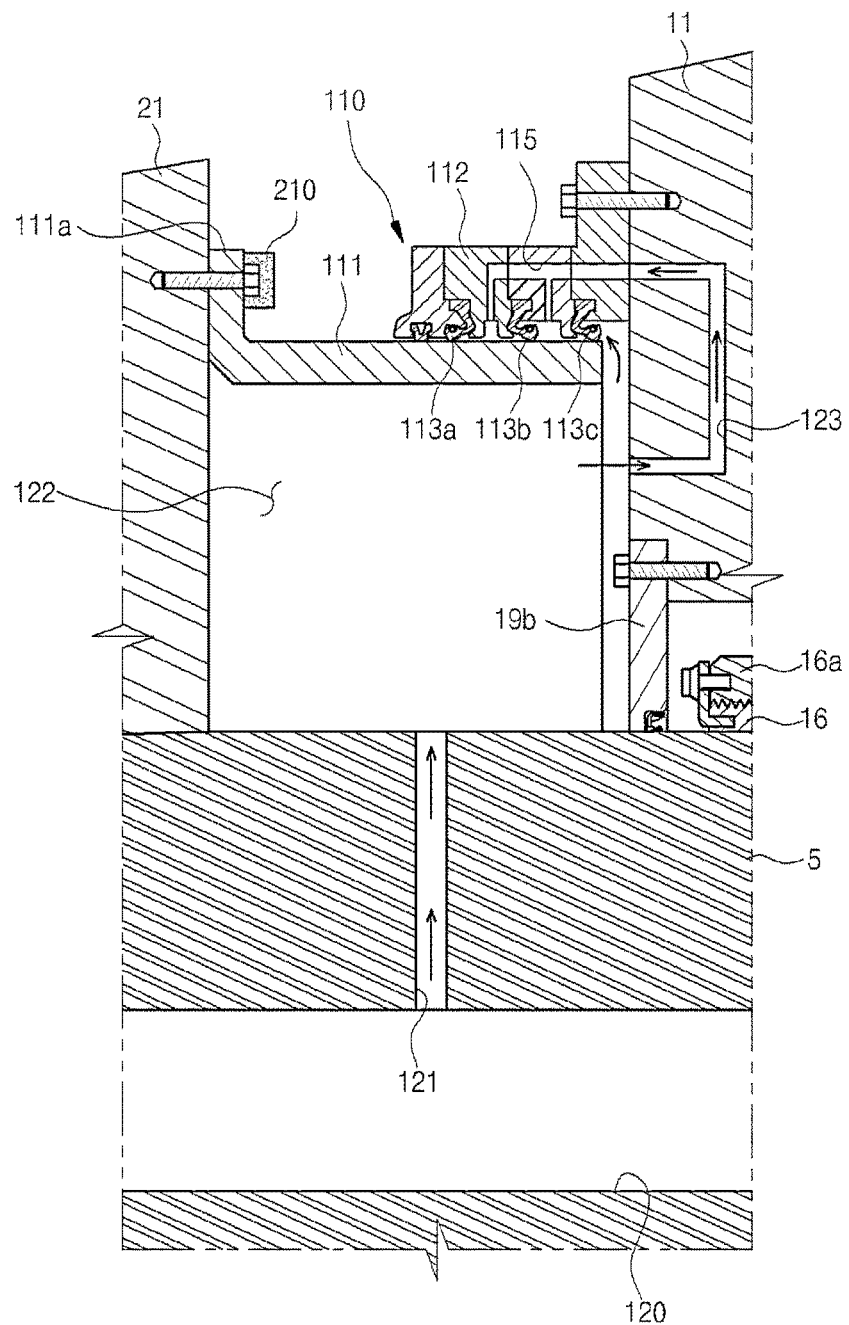
FIG. 17 is a cross-sectional view illustrating an example in which the anodes are attached to a flange of a second lining of the second sealing unit of FIG. 15.

Further, referring to FIG. 17, similar to the foregoing, the aforementioned anodes 210 are attached to a flange 111*a* of the second lining 111 so as to protrude from the flange 111*a* in a given pattern, and prevent corrosion of the second lining 111 and the second sealing unit 110. A method of preventing the corrosion is described above, and thus is omitted.

Figure 16:
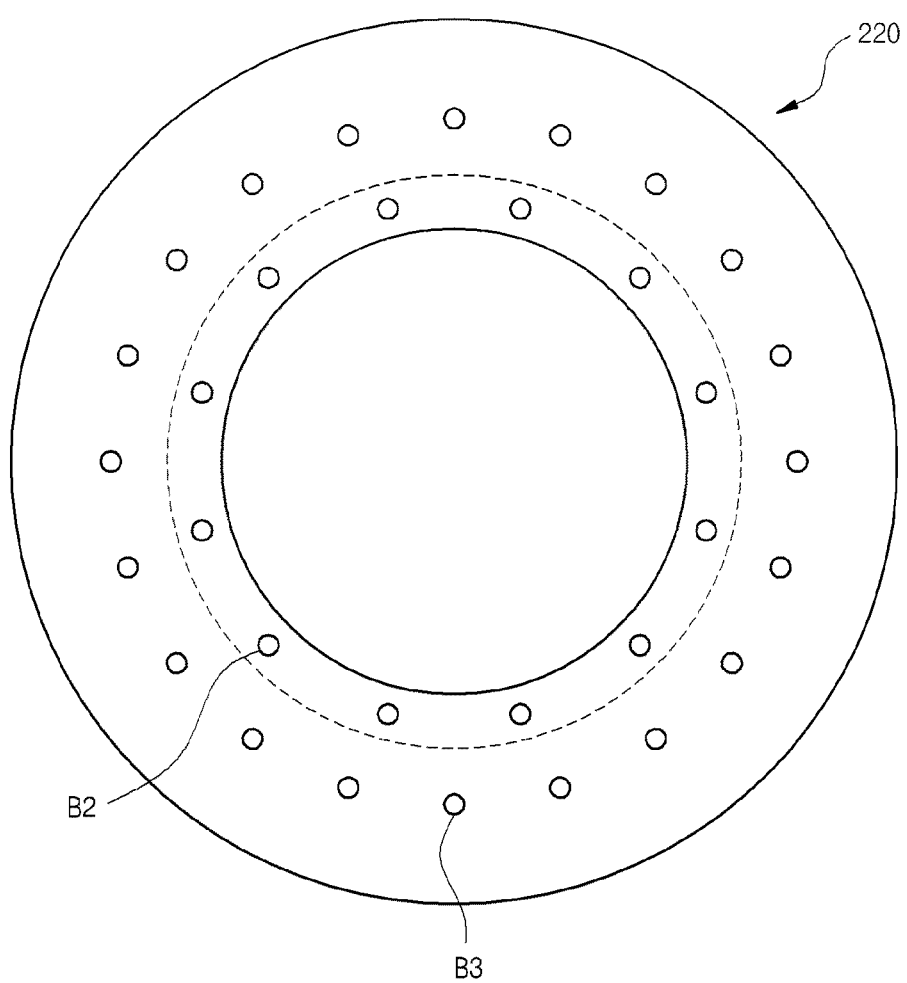
FIG. 16 is a cross-sectional view illustrating a corrosion-resistant cover interposed between the flange of the first lining of the corrosion-resistant unit of FIG. 14 and a connecting flange of the propeller connecting member.

Referring to FIGS. 14 and 16, the corrosion-resistant cover 220 is interposed between the flange 91*h* of the first lining 91 and the connecting flange 33*b*, and covers an outer surface of the connecting flange 33*b* which is exposed outward from the coupled region of the flange 91*h* and the connecting flange 33*b*. The corrosion-resistant cover 220 may be formed of, for instance, steel use stainless (SUS), and allows the outer surface of the connecting flange 33*b* which is exposed outward from the coupled region of the flange 91*h* and the connecting flange 33*b* to be protected from the corrosion caused by the sea water.

The corrosion-resistant cover 220 is provided with first fastening holes B2 which have a through-hole shape and to which fixing means for fixing the flange 91*h* to the connecting flange 33*b* are fixed, and second fastening holes B3 which have a through-hole shape and to which fixing means for fixing the connecting flange 33*b* to the hub 11 of the front propeller are fixed. Here, the first flange holes B2 are formed to correspond to the fastening holes B1 formed in the flange 91*h*, and are allowed to fix the flange 91*h* to the connecting flange 33*b* by fastening the multiple fixing bolts 91*i*.

Further, the corrosion-resistant cover 220 may be provided with a sealing groove 221 into which a sealing member 223 is fitted at a position corresponding to the outer coupled region of the flange 91*h* and the connecting flange 33*b*. Thereby, the outer coupled region of the flange 91*h* and the connecting flange 33*b* can be completely sealed and sealed to prevent foreign material from entering an empty gap of the coupled region.

Figure 18:
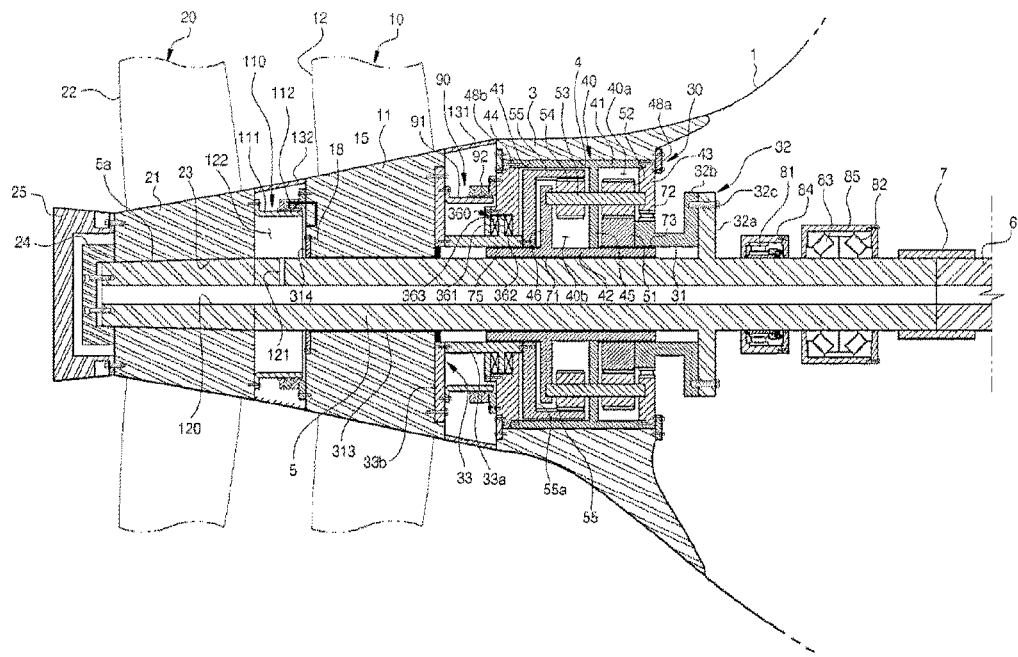
FIG. 18 is a cross-sectional view of a propulsion system according to a second embodiment of the present invention.
Figure 19:
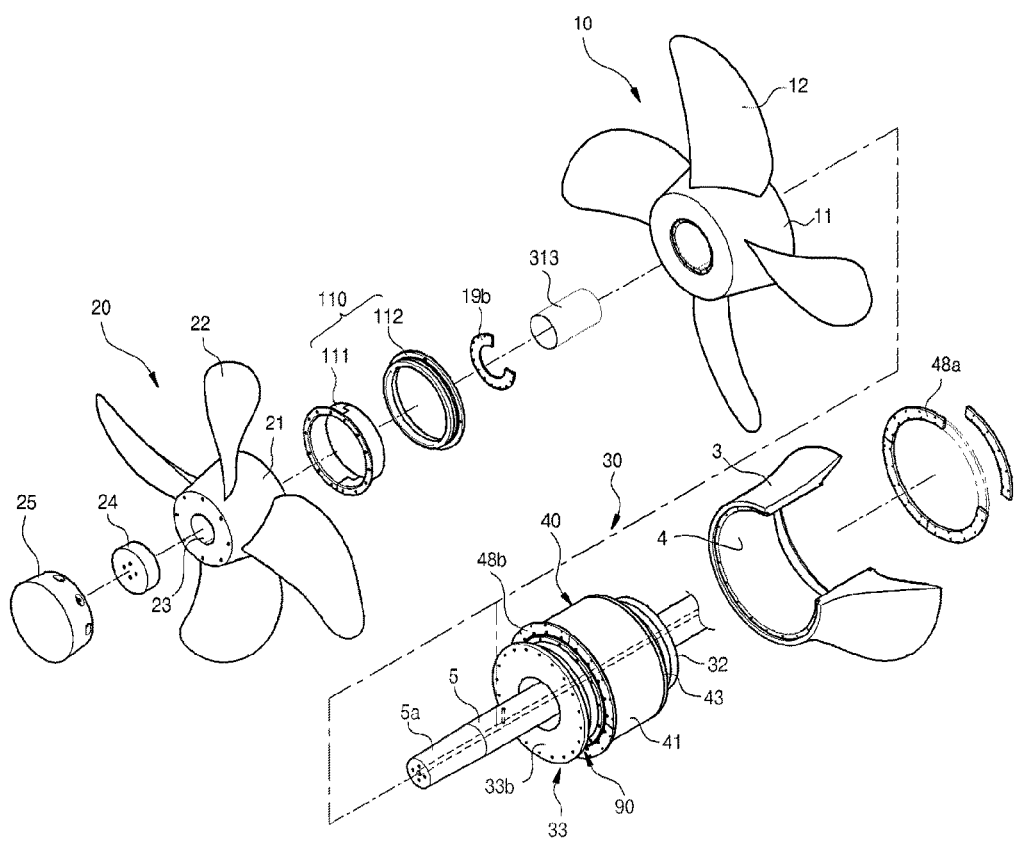
FIG. 19 is an exploded perspective view of the propulsion system according to the second embodiment of the present invention.

Hereinafter, a propulsion system according to a second embodiment of the present invention will be described with reference to FIGS. 18 to 21, but the content repeated with the foregoing will be omitted as far as possible. As illustrated in FIGS. 18 and 19, a rear propeller 20 is fixed to a rear end of a rotary shaft 5 so as to be rotated along with the rotary shaft 5. The rear propeller 20 includes a hub 21 fixed to the rotary shaft 5 and multiple blades 22 provided on an outer surface of the hub 21, the hub 21 of the rear propeller 20 may be fixed in such a manner that an outer surface of the rotary shaft 5 is forcible fitted onto a shaft coupling hole 23 of a central portion thereof. A fixing cap 24 is fastened to a rear end face of the rotary shaft 5, and thereby the rear propeller 20 may be more firmly fixed to the rotary shaft 5.

For the purpose of this coupling, a rear end of the rotary shaft 5 may be provided to have a tapered outer surface whose outer diameter is gradually reduced in a rearward direction, and the shaft coupling hole 23 of the hub 21 may be formed to have a tapered inner surface corresponding to an outer surface of the rotary shaft 5.

A front propeller 10 is rotatably installed on the outer surface of the rotary shaft 5 between the rear propeller 20 and a contra-rotating device 30. The front propeller 10 includes a hub 11 rotatably supported on the outer surface of the rotary shaft 5 and multiple blades 12 provided on an outer surface of the hub 11. Prior to installing the rear propeller 20, the front propeller 10 may be on the outer surface of the rotary shaft 5. The front propeller 10 is rotated in the opposite direction to the rear propeller 20, a blade angle thereof is opposite to that of the rear propeller 20.

Figure 21:
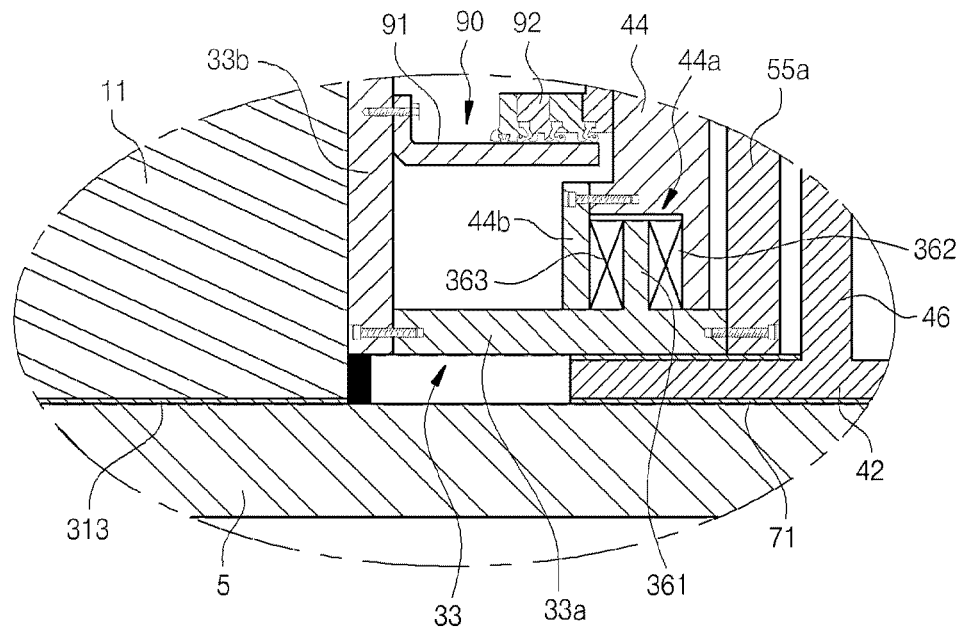
FIG. 21 is a detailed view illustrating a thrust supporting device of the propulsion system according to the second embodiment of the present invention.

As illustrated in FIGS. 18 and 21, the hub 11 of the front propeller 10 may be rotatably supported on the outer surface of the rotary shaft 5 by a cylindrical journal bearing 313. A rear end of the journal bearing 313 is supported by a sealing cover 314 installed on a rear face of the hub 11, and thereby the journal bearing 313 can be prevented from deviation from the coupling position.

Figure 20:
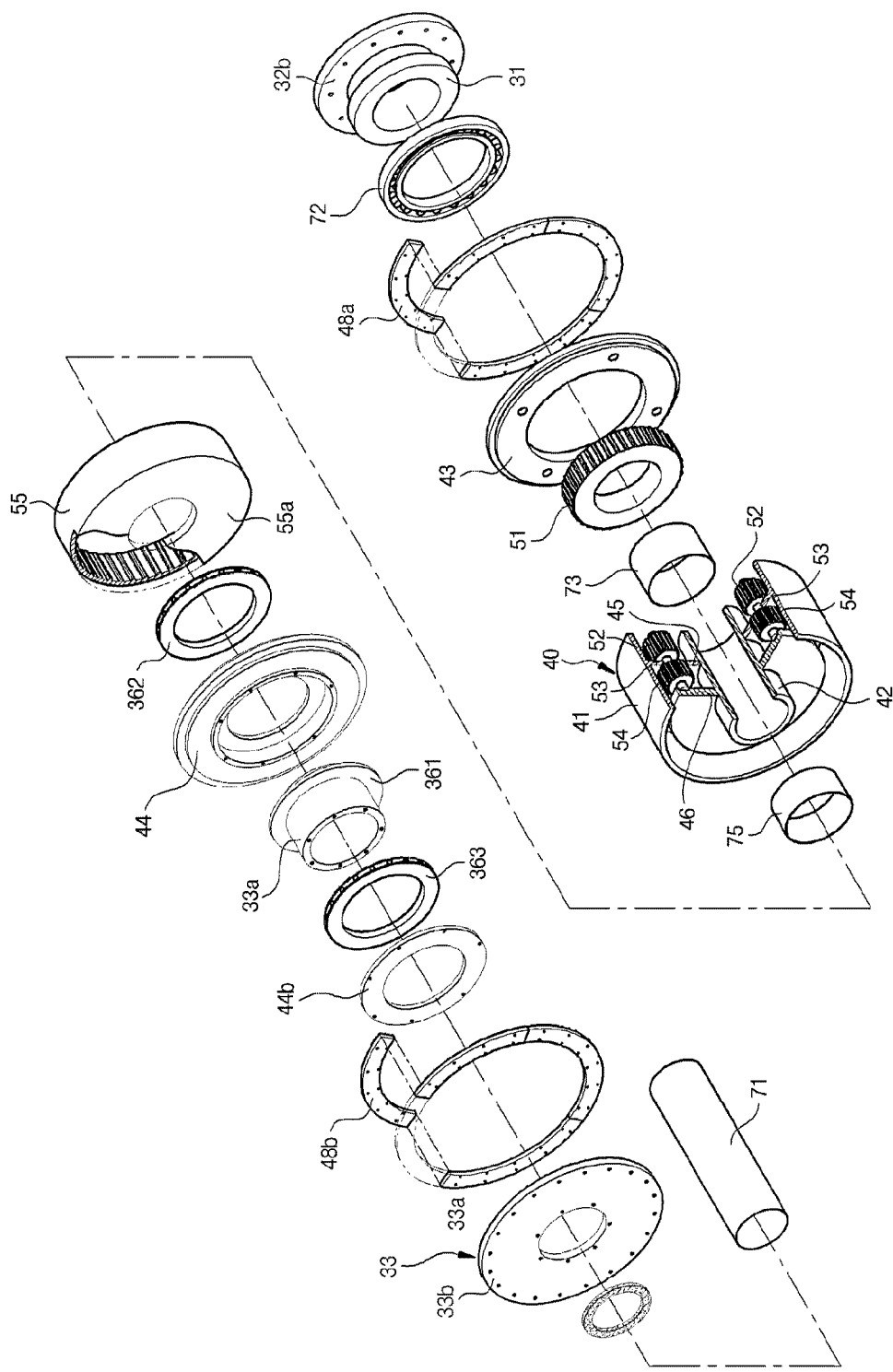
FIG. 20 is an exploded perspective view of a contra-rotating device of the propulsion system according to the second embodiment of the present invention.

As illustrated in FIGS. 18 and 20, a gearbox 40 of the contra-rotating device 30 includes a cylindrical outer frame 41 in which a contra-rotating gear unit (to be described below) is housed and opposite ends of which are open, an inner frame 42 that is disposed at an inner central portion of the outer frame 41 and supports the outer surface of the rotary shaft 5, a front cover 43 that is removably mounted on the outer frame 41 and closes a front opening of the outer frame 41, a rear cover 44 that is removably mounted on the outer frame 41 and closes a rear opening of the outer frame 41, and a support plate 45 that partitions an internal space of the gearbox 40 into front and rear spaces 40a and 40b and connects the outer and inner frames 41 and 42. A cylindrical journal bearing 71 may be installed between the outer surface of the rotary shaft 5 and an inner surface of the inner frame 42 for the purpose of smooth rotation of the rotary shaft 5 and supporting loads of the propellers.

The contra-rotating gear unit inside the gearbox 40 includes a sun gear 51 that is rotatably supported on an outer surface of the inner frame 42 in the front space 40a and is connected to the rotary shaft 5 by a cylindrical shaft connecting member 31, a plurality of first planetary gears 52 that are disposed outside the sun gear 51 in the front space 40a and are rotated in mesh with the sun gear 51, a plurality of planetary gear shafts 53 that are connected to the first planetary gears 52, pass through the support plate 45, and extend toward the rear space 40b, a plurality of second planetary gears 54 that are coupled to the planetary gear shafts 53 in the rear space 40b and are rotated along with the first planetary gears 52, and a ring gear 55 that is installed in the rear space 40b, is meshed with the second planetary gears 54 by a toothed portion formed on an inner surface thereof, and has a disc-like connector 55a connected to the front propeller 10 by a cylindrical propeller connecting member 33 (to be described below). The rotation of the ring gear 55 is transmitted to the front propeller 10 by the propeller connecting member 33. The front propeller 10 and the rear propeller 20 may implement contra-rotation.

Further, the gearbox 40 is provided with a planetary gear shaft support 46 that extends from the inner frame 42 to an outer side of the rear space 40b and supports one end of each planetary gear shaft 53. That is, the plurality of planetary gear shafts 53 are rotatably supported on the support plate 45 after middle portions thereof pass through the support plate 45, and opposite ends thereof are rotatably supported on the front cover 43 and the planetary gear shaft support 46 respectively. Therefore, the first planetary gears 52 and the second planetary gears 54 fixed to outer surfaces of the planetary gear shafts 53 can be rotated along with the planetary gear shafts 53. Although not illustrated in the figures, portions at which the planetary gear shafts 53 are supported on the front cover 43, the support plate 45, and the planetary gear shaft support 46 may be mounted with respective bearings for smooth rotation of the planetary gear shafts 53.

The shaft connecting member 31 connecting the sun gear 51 and the rotary shaft 5 is provided in a cylindrical shape, and is installed outside the rotary shaft 5 in such a manner that it passes through the front cover 43. In the shaft connecting member 31, a rear end thereof is connected to the sun gear 51 by fastening multiple fixing bolts (not shown), and a front end thereof is connected to the rotary shaft 5 by a power transmission joint 32 (to be described below). Further, the shaft connecting member 31 is rotatably supported by a front bearing 72 installed between the front cover 43 and an outer surface thereof. The sun gear 51 and an inner surface of the shaft connecting member 31 may be rotatably supported by a journal bearing 73 installed on the outer surface of the inner frame 42.

As illustrated in FIG. 18, the power transmission joint 32 connecting the rotary shaft 5 and the shaft connecting member 31 may include a driving flange 32a provided for the rotary shaft 5 in front of the gearbox 40, a driven flange 32b provided for the shaft connecting member 31 so as to face the driving flange 32a, and a plurality of connecting bolts 32c that pass through the driving flange 32a to be fastened to the driven flange 32b.

The propeller connecting member 33 connecting the contra-rotating device 30 and the front propeller 10 is provided with a connecting part 33a which is provided in a cylindrical shape and whose front end is connected to a connector 55a of the ring gear 55 in a bolt fastening way, and a connecting flange 33b that is coupled to a rear end of the connecting part 33a and is coupled to the hub 11 of the front propeller 10. The connecting flange 33b may be fixed to a front end face of the hub 11 of the front propeller 10 by fastening a plurality of bolts. A cylindrical journal bearing 75 may be installed to rotatably support the propeller connecting member 33 between the outer surface of the inner frame 42 and an inner surface of the connecting part 33a.

As illustrated in FIGS. 18 and 21, a thrust supporting device 360 for supporting thrust of the front propeller 10 is provided between the propeller connecting member 33 and the rear cover 44 of the gearbox 40. The thrust supporting device 360 includes a thrust pad 361 flanged to an outer surface of the propeller connecting member 33, and first and second thrust bearings 362 and 363 that are installed on the rear cover 44 and respectively support opposite surfaces of the thrust pad 361. To install the thrust supporting device 360, the rear cover 44 is provided with a cage 44a that houses the thrust pad 361 and the first and second thrust bearings 362 and 363, and a cap member 44b that opens and closes one side of the cage 44a. The cap member 44b may be coupled to the rear cover 44 by fastening bolts, and enables installation and maintenance of the thrust supporting device 360 when opened.

In the thrust supporting device 360, the first and second thrust bearings 362 and 363 can support a forward/backward thrust load transmitted from the front propeller 10 via the propeller connecting member 33. In detail, the first thrust bearing 362 can support the thrust load acting from the front propeller 10 toward the stem when the ship goes ahead, and the second thrust bearing 363 can support the thrust load acting from the front propeller 10 toward the stern when the ship goes astern.

This thrust supporting device 360 can support the thrust of the front propeller 10, and thus make it possible to simplify an installation structure of the front propeller 10. That is, as illustrated in FIG. 21, a cylindrical journal bearing 313 is merely installed between the hub 11 of the front propeller 10 and the outer surface of the rotary shaft. Thereby, it is possible to realizing rotatable installation of the front propeller 10.

With regard to an operation of the propulsion system according to the second embodiment of the present invention, the front propeller 10 generates a backward propulsive water stream when the ship goes ahead, and thus undergoes a repulsive force corresponding to the propulsive water stream. This repulsive force is transmitted to the gearbox 40 via the propeller connecting member 33 and the first thrust bearing 362 of the thrust supporting device 360, and acts as a propulsive force. The rear propeller 20 also generates the backward propulsive water stream when the ship goes ahead, and thus receives a repulsive force. This repulsive force is also transmitted to the directly connected rotary shaft 5, and acts as the propulsive force.

When the ship goes astern, the propulsive force of the front propeller 10 is transmitted to the gearbox 40 via the propeller connecting member 33 and the second thrust bearing 363 of the thrust supporting device 360, and the propulsive force of the rear propeller 20 is transmitted to the directly connected rotary shaft 5.

The propulsive force transmitted from the rear propeller 20 to the rotary shaft 5 is transmitted to the hull 1 via third and fourth thrust bearings 82 and 83, and thus the hull 1 is propelled.

Hereinafter, a propulsion system for a ship according to a third embodiment of the present invention will be described with reference to FIGS. 22 to 26. However, content overlapping with the foregoing will be omitted as far as possible.

Figure 22:
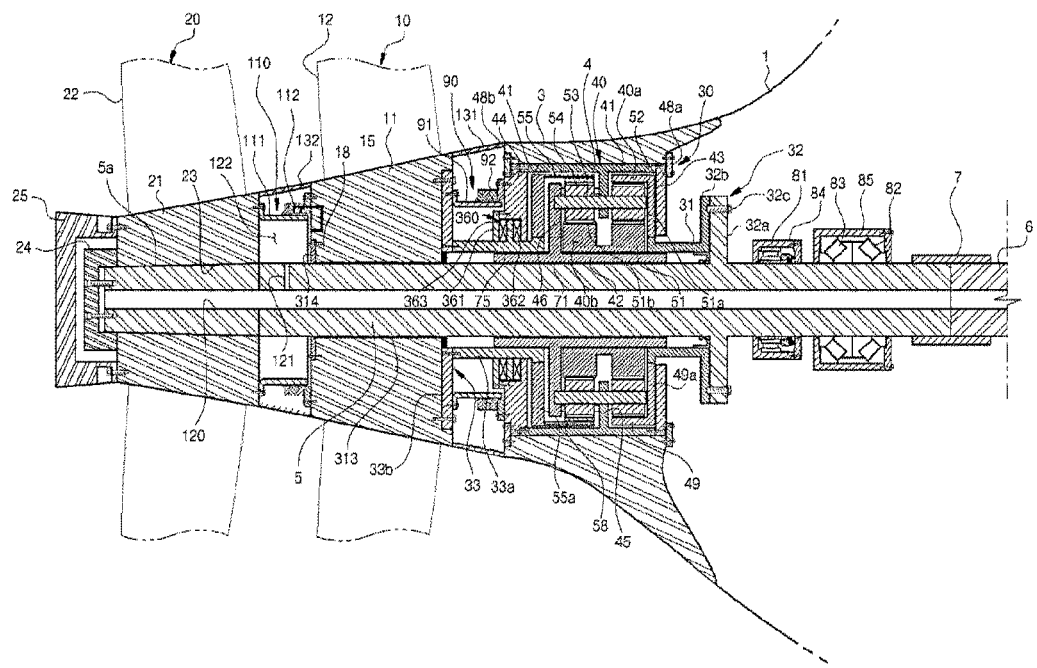
FIG. 22 is a cross-sectional view of a propulsion system according to a third embodiment of the present invention.
Figure 23:
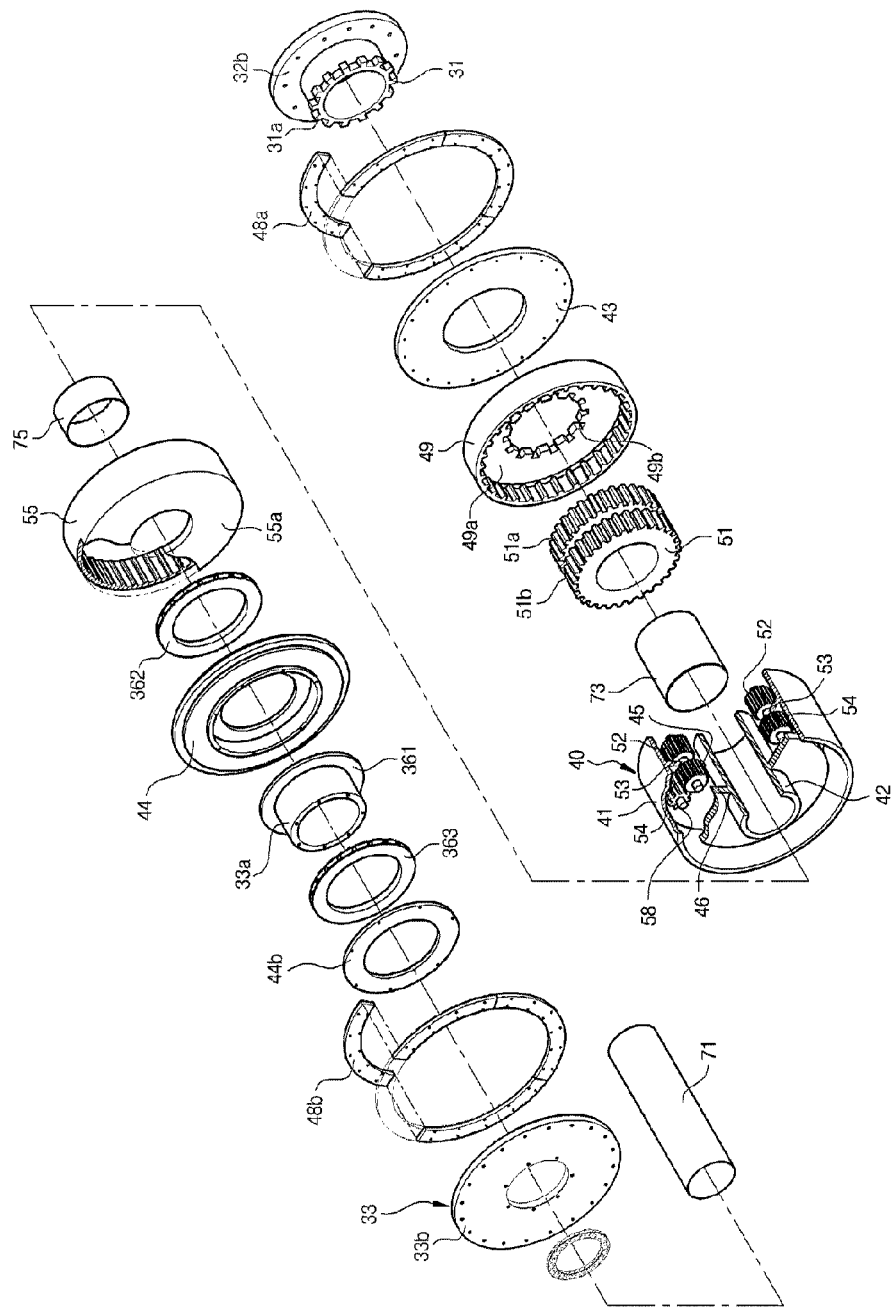
FIG. 23 is an exploded perspective view of a contra-rotating device of the propulsion system according to the third embodiment of the present invention.

Referring to FIGS. 22 and 23, a contra-rotating gear unit in a gearbox 40 includes a first ring gear 49 that is rotatably supported inside an outer frame 41 in a front space 40a and has a disc-like first connector 49a connected to a rotary shaft 5 by a cylindrical shaft connecting member 31, a plurality of first planetary gears 52 that are disposed inside the first ring gear 49 and are meshed with a toothed portion formed on an inner surface of the first ring gear 49, a plurality of planetary gear shafts 53 that are connected to the first planetary gears 52, pass through a support plate 45, and extend toward a rear space 40b, a plurality of second planetary gears 54 that are coupled to the planetary gear shafts 53 in the rear space 40b and are rotated along with the first planetary gears 52, a sun gear 51 that is rotatably supported on an outer surface of an inner frame 42 and has first and second toothed portions 51a and 51b formed on an outer surface thereof and rotated in mesh with toothed portions of the plurality of first and second planetary gears 52 and 54, a plurality of idle gears 58 that are rotated in mesh with the plurality of second planetary gears 54 located in the rear space 40b, and a second ring gear 55 that is installed in the rear space 40b, is meshed with the plurality of idle gears 58 by a toothed portion formed on an inner surface thereof, and has a disc-like second connector 55a connected to a front propeller 10 by a propeller connecting member 33 to be described below.

Further, the gearbox 40 is provided with a planetary gear shaft support 46 that extends from the inner frame 42 to an outer side of the rear space 40b and supports one end of each of the plurality of planetary gear shafts 53 and one end of each rotary shaft of the plurality of idle gears 58. The plurality of planetary gear shafts 53 are rotatably supported on the support plate 45 in a state in which middle portions thereof pass through the support plate 45, and opposite ends thereof are rotatably supported on a front cover 43 and the planetary gear shaft support 46 respectively. Therefore, the first planetary gears 52 and the second planetary gears 54 fixed to outer surfaces of the planetary gear shafts 53 can be rotated along with the planetary gear shafts 53. Opposite ends of the rotary shafts of the plurality of idle gears 58 are rotatably supported on the support plate 45 and the planetary gear shaft support 46. Although not illustrated in the figures, portions at which the planetary gear shafts 53 and the rotary shafts of the plurality of idle gears 58 are supported on the front cover 43, the support plate 45, and the planetary gear shaft support 46 may be mounted with respective bearings for smooth rotation of the planetary gear shafts 53 and the rotary shafts of the idle gears 58.

The shaft connecting member 31 connecting the first ring gear 49 and the rotary shaft 5 is provided in a cylindrical shape. In the shaft connecting member 31, a front end thereof is connected to the rotary shaft 5 via a power transmission joint 32 to be described below by fastening multiple fixing bolts (not shown), and a rear end thereof is connected to the first connector 49a of the first ring gear 49 in a spline coupling fashion. To this end, an inner circumferential surface of the first connector 49a of the first ring gear 49 may be provided with numerous key grooves 49b disposed apart from one another in a circumferential direction, and a rear end of the shaft connecting member 31 may be provided with numerous keys 31a protruding from an outer circumferential surface of the rear end of the shaft connecting member 31 so as to correspond to the numerous key grooves 49b. Thus, the shaft connecting member 31 transmits power of the rotary shaft 5 to the contra-rotating gear unit. In addition to this function, as illustrated in FIG. 24, the shaft connecting member 31 not only allows the gearbox 40 to be easily mounted in an installation space 4 of a rear end 3 of a hull by sliding only the gearbox 40 along the rotary shaft 5 without separating the shaft connecting member 31 from the rotary shaft 5, but it also allows the gearbox 40 to be demounted separately from the rotary shaft 5 by sliding only the gearbox 40 to the rear of the hull 1 in the installation space 4 along the rotary shaft 5 when the gearbox 40 is demounted.

Figure 24:
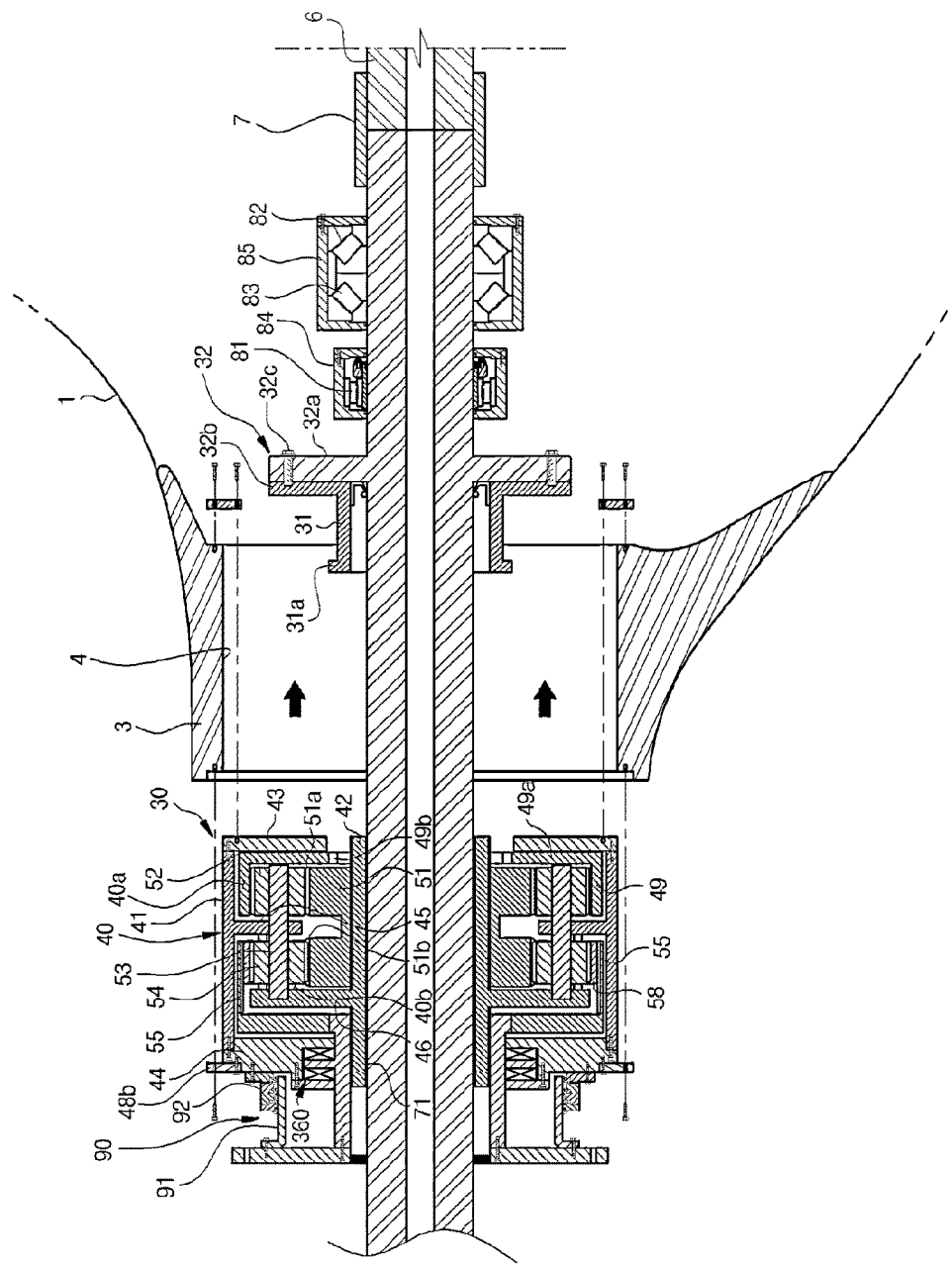
FIG. 24 is a cross-sectional view illustrating an example of mounting the contra-rotating device of the propulsion system according to the third embodiment of the present invention, wherein the contra-rotating device is separated.

As illustrated in FIGS. 22 and 24, the power transmission joint 32 connecting the rotary shaft 5 and the shaft connecting member 31 may include a driving flange 32a provided for the rotary shaft 5 in front of the gearbox 40, a driven flange 32b provided for the shaft connecting member 31 so as to face the driving flange 32a, and a plurality of connecting bolts 32c that pass through the driving flange 32a to be fastened to the driven flange 32b.

Figure 25:
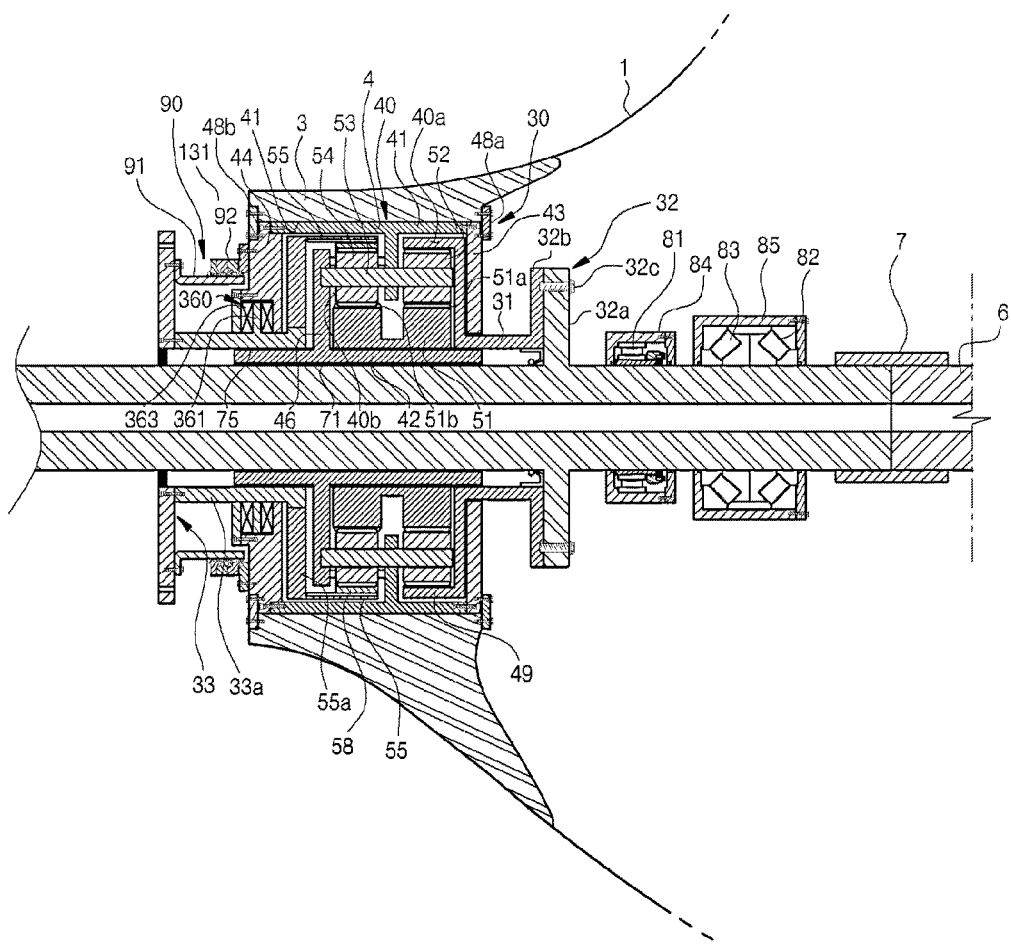
FIG. 25 illustrates a connection relation between a sun gear and a shaft connecting member according to another embodiment of the present invention.
Figure 26:
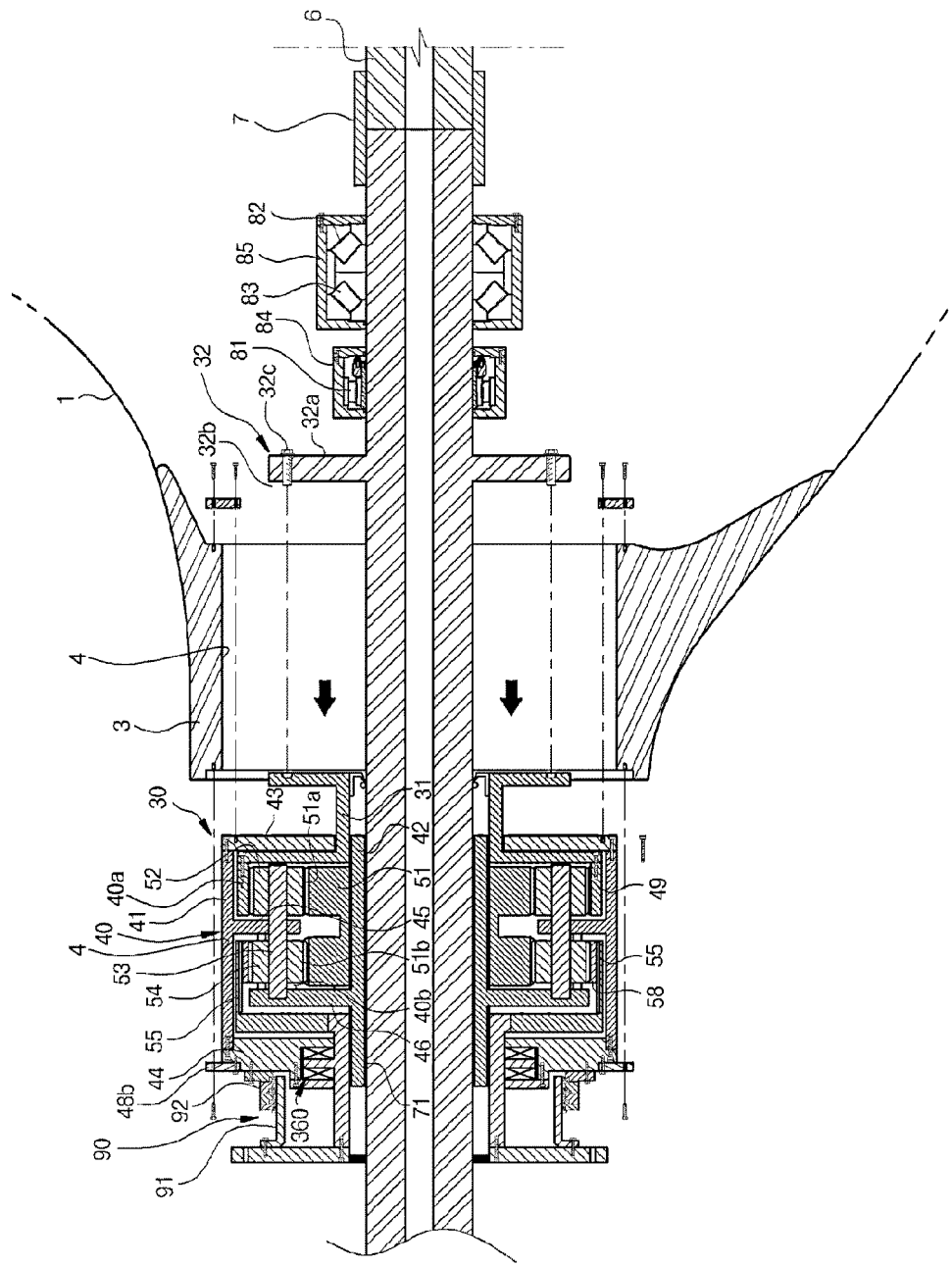
FIG. 26 illustrates a state in which a gearbox of FIG. 25 and the shaft connecting member are separated.

Meanwhile, unlike the structure in which the shaft connecting member 31 connecting the first ring gear 49 and the rotary shaft 5 is coupled with the first ring gear 49 in the spline coupling fashion, as illustrated in FIGS. 25 and 26, the shaft connecting member 31 may be coupled in such a manner that a rear end thereof is connected to the first ring gear 49 by fastening a plurality of fixing bolts (not shown), then passes through the front cover 43, and is connected to the driving flange 32a formed at the rotary shaft 5 by a plurality of fixing bolts. In this case, the first connector 49a of the first ring gear 49 for the coupling of the spline coupling fashion can be removed, and a disc shape of the rear end of the shaft connecting member 31 can replace such a removal. That is, the shaft connecting member 31 is not limited to a shape if it has a structure capable of transmitting a rotational force of the rotary shaft 5 to the first ring gear 49 of the contra-rotating gear unit.

Due to this structure, as illustrated in FIG. 26, when the contra-rotating gear unit of the gearbox 40 causes malfunction, the plurality of connecting bolts 32c that connect the driving flange 32a and the driven flange 32b are unfastened in the hull 1, and thereby the gearbox 40 is readily separated from the rotary shaft 5. The separated gearbox 40 slides toward the rear of the hull 1 along the rotary shaft 5, and thereby only the gearbox 40 can be separately demounted from the rotary shaft 5.

While the specific embodiments have been illustrated and described above. However, the present invention is not limited to the aforementioned embodiments. It will be apparent to those skilled in the art that various modifications or alterations can be made without departing from the scope and spirit of the invention as described in the accompanying claims.

The invention claimed is:

1. A propulsion system for a ship comprising:
a rear propeller fixed to a rotary shaft;
a front propeller rotatably supported on the rotary shaft in front of the rear propeller;
a contra-rotating device mounted in an installation space at a rear end of a hull so as to reverse rotation of the rotary shaft and transmit the reversed rotation to the front propeller;
a propeller connecting member configured to connect the contra-rotating device and the front propeller to transmit a rotational force; and
a thrust supporting device provided between the contra-rotating device and the propeller connecting member to support thrust of the front propeller,
wherein the contra-rotating device includes a gearbox that has an outer surface corresponding to a shape of an inner surface of the installation space and is installed to be slidable from a rear of the hull into the installation space, and a contra-rotating gear unit that is installed in the gearbox and implements reverse rotation of the front propeller, and
wherein the gearbox includes an outer frame having open opposite ends, an inner frame that is disposed at an inner central portion of the outer frame and supports an outer surface of the rotary shaft, a front cover that closes a front opening of the outer frame, a rear cover that closes a rear opening of the outer frame, and a support plate that connects the outer and inner frames to support the inner frame and partitions an internal space of the gearbox into front and rear spaces.

2. The propulsion system according to claim 1, wherein:
the propeller connecting member extends from the front propeller into the gearbox and is connected to the contra-rotating gear unit; and
the thrust supporting device includes a thrust pad provided to an outer surface of the propeller connecting member, and first and second thrust bearings that are installed in the gearbox and respectively support opposite surfaces of the thrust pad.

3. The propulsion system according to claim 1, wherein the contra-rotating gear unit includes a sun gear that is rotatably supported on an outer surface of the inner frame in the front space and is connected to the rotary shaft by a shaft connecting member, a plurality of first planetary gears that are disposed outside the sun gear in the front space and are rotated in mesh with the sun gear, a plurality of planetary gear shafts that are connected to the first planetary gears and pass through the support plate to extend toward the rear space, a plurality of second planetary gears that are coupled to the planetary gear shafts in the rear space and are rotated along with the first planetary gears, and a ring gear which is installed in the rear space, in which the second planetary gears is mashed with a toothed portion formed on an inner surface thereof, and which has a connector connected to the propeller connecting member.

4. The propulsion system according to claim 3, wherein the thrust supporting device includes a thrust pad provided to an outer surface of the propeller connecting member, and first and second thrust bearings that are installed in the rear cover and respectively support opposite surfaces of the thrust pad.

5. The propulsion system according to claim 4, wherein the rear cover includes a cage that houses the thrust pad and the first and second thrust bearings, and a cap member that opens and closes one side of the cage.

6. The propulsion system according to claim 3, wherein the gearbox further includes a planetary gear shaft support that extends from the inner frame to an outer side of the rear space and supports the plurality of planetary gear shafts.

7. The propulsion system according to claim 1, wherein the propeller connecting member includes a connecting flange connected to a hub of the front propeller.

8. The propulsion system according to claim 7, further comprising:
a cylindrical first lining that includes a flange fixed to the connecting flange and is installed on the connecting flange in order to seal between the hub of the front propeller and the rear end of the hull; and
a cylindrical first sealing member that is installed on the rear cover so as to be in contact with an outer surface of the first lining.

9. The propulsion system according to claim 8, further comprising a corrosion-resistant unit that is interposed at least one of between the hub of the front propeller and the rear end of the hull and between the hub of the front propeller and a hub of the rear propeller.

10. The propulsion system according to claim 9, wherein the corrosion-resistant unit includes a plurality of anodes that are attached to the flange so as to protrude from the flange and prevent corrosion of the first lining and the first sealing member.

11. The propulsion system according to claim 9, wherein the corrosion-resistant unit includes a corrosion-resistant cover that is interposed between the flange and the connecting flange and covers an outer surface of the connecting flange which is exposed outward from a coupled region of the flange and the connecting flange.

12. The propulsion system according to claim 11, wherein the corrosion-resistant cover includes a sealing groove to which a sealing member is attached at a position corresponding to an outer coupled region of the connecting flange and the hub of the front propeller.

13. A method of assembling a propulsion system for a ship, in which the propulsion system includes: a rear propeller fixed to a rotary shaft; a front propeller rotatably supported on the rotary shaft in front of the rear propeller; a contra-rotating device having a gearbox mounted in an installation space at a rear end of a hull so as to reverse rotation of the rotary shaft and transmit the reversed rotation to the front propeller; and a propeller connecting member configured to connect the contra-rotating device and the front propeller to transmit a rotational force, the method comprising:

(a) putting the gearbox into the installation space to install the contra-rotating device in the installation space;

(b) installing the front propeller on the rotary shaft; and (c) installing the rear propeller on the rotary shaft, wherein the step (a) includes a process of assembling the gearbox on an outer surface of the rotary shaft and putting the gearbox into the installation space from a rear of the hull along with the rotary shaft, or a process of connecting the rotary shaft and a driving shaft connected to a drive source installed in the hull and installing the gearbox on the rotary shaft, and wherein the step (a) includes fixing a rear of the gearbox to the installation space, and fixing a front of the gearbox to the installation space.

14. The method according to claim 13, wherein the step (b) includes coupling a hub of the front propeller and the propeller connecting member.

15. A method of disassembling the propulsion system for the ship assembled by the assembling method according to claim 13, the method comprising:

(a) separating the rear propeller from the rotary shaft;

(b) separating the front propeller from the rotary shaft;

(c) displacing the rotary shaft a given distance toward a stem of the ship; and (d) separating the contra-rotating device from the installation space.

16. The method according to claim 15, wherein the step (c) includes separating an intermediate driving shaft interposed between the rotary shaft and a main driving shaft connected to the drive source installed in the hull, and displacing the rotary shaft a given distance into an empty space from which the intermediate driving shaft is separated before the contra-rotating device is separated.

17. The method according to claim 15, wherein the step (d) includes unfixing the gearbox fixed to the installation space, fastening bolts to a front fixing member fixing the gearbox to the installation space so as to apply a force to the gearbox, and separating the gearbox from the installation space.

* * * * *